US012710906B2

(12) United States Patent
Hozumi et al.

(10) Patent No.: US 12,710,906 B2
(45) Date of Patent: Aug. 18, 2026

(54) IMAGE PROCESSING APPARATUS, CONTROL METHOD, AND PROGRAM

(71) Applicant: KYOCERA CORPORATION, Kyoto (JP)

(72) Inventors: Daisuke Hozumi, Stuttgart (DE); Kai Shimizu, San Diego, CA (US); Hiroshi Itoh, Suita (JP); Hirofumi Suzuki, Koka (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 19/002,713

(22) Filed: Dec. 27, 2024

(65) Prior Publication Data

US 2025/0130750 A1 Apr. 24, 2025

Related U.S. Application Data

(63) Continuation of application No. PCT/JP2022/026813, filed on Jul. 6, 2022.

(51) Int. Cl.
*G09G 5/00* (2006.01)
*G06F 3/0482* (2013.01)
*G06F 3/14* (2006.01)

(52) U.S. Cl.
CPC .............. *G06F 3/14* (2013.01); *G06F 3/0482* (2013.01)

(58) Field of Classification Search
CPC ........... H04N 1/00474; H04N 1/00389; H04N 1/00413; H04N 1/00411; H04N 1/00509; H04N 1/00503; G06F 3/0485; G06F 3/0481; G06F 3/0482; G06F 3/04883; G06F 3/14; G06F 3/04886; G06F 3/04817; G06F 2203/04803
USPC .......................................................... 345/156
See application file for complete search history.

(56) References Cited

U.S. PATENT DOCUMENTS

| | | | |
|---|---|---|---|
| 8,963,962 | B2 | 2/2015 | Ubillos |
| 8,971,617 | B2 | 3/2015 | Ubillos et al. |
| 8,971,623 | B2 | 3/2015 | Gatt et al. |
| 9,041,727 | B2 | 5/2015 | Ubillos et al. |
| 9,092,893 | B2 | 7/2015 | Ubillos et al. |
| 9,105,121 | B2 | 8/2015 | Ubillos et al. |
| 9,131,192 | B2 | 9/2015 | Ubillos et al. |
| 9,159,144 | B2 | 10/2015 | Cherna et al. |

(Continued)

FOREIGN PATENT DOCUMENTS

| | | | |
|---|---|---|---|
| EP | 2955613 | B1 | 6/2020 |
| JP | 2002-216051 | A | 8/2002 |

(Continued)

*Primary Examiner* — Jennifer T Nguyen
(74) *Attorney, Agent, or Firm* — HAUPTMAN HAM, LLP

(57) ABSTRACT

An image processing apparatus for executing a plurality of functions related to image processings includes an operation panel and a controller. The operation panel includes a display configured to display a first history screen on which a menu region and a history region are arranged. In the menu region, function buttons corresponding to a plurality of functions are arranged. In the history region, history buttons corresponding to completed image processings are arranged. The controller is configured to control the display to switch from the first history screen to a second history screen on which the history region is expanded, in response to user operation on the operation panel.

20 Claims, 13 Drawing Sheets

(56) References Cited

U.S. PATENT DOCUMENTS 9,189,876 B2 11/2015 Ubillos et al.
9,202,433 B2 12/2015 Webb
9,299,168 B2 3/2016 Ubillos et al.
9,363,220 B2 6/2016 Ubillos et al.
9,569,078 B2 2/2017 Cherna et al.
9,591,181 B2 3/2017 Cunningham
9,886,931 B2 2/2018 Webb
10,282,055 B2 5/2019 Cherna et al.
10,545,631 B2 1/2020 Ubillos et al.
10,552,016 B2 2/2020 Cherna et al.
10,936,173 B2 3/2021 Ubillos et al.
10,942,634 B2 3/2021 Ubillos et al.
11,119,635 B2 9/2021 Ubillos et al.
11,481,097 B2 10/2022 Ubillos et al.
2002/0099565 A1 7/2002 Kito
2010/0081475 A1* 4/2010 Chiang ............... H04M 1/2747 715/788
2013/0238747 A1 9/2013 Albouze et al.
2013/0239031 A1 9/2013 Ubillos et al.
2013/0239051 A1 9/2013 Albouze et al.
2013/0239062 A1 9/2013 Ubillos et al.
2013/0239063 A1 9/2013 Ubillos et al.
2015/0186024 A1* 7/2015 Hong ...................... G06F 9/542 715/800
2015/0205502 A1 7/2015 Ubillos et al.
2016/0173726 A1 6/2016 Ubillos et al.
2018/0220015 A1* 8/2018 Akuzawa ................. H04N 1/21
2021/0329136 A1* 10/2021 Hirobe .................. G06F 3/0485

FOREIGN PATENT DOCUMENTS

JP 2014-522527 A 9/2014
JP 2020-181304 A 11/2020
JP 2021-175020 A 11/2021
WO 2014103388 A1 7/2014

* cited by examiner

FIG. 6A

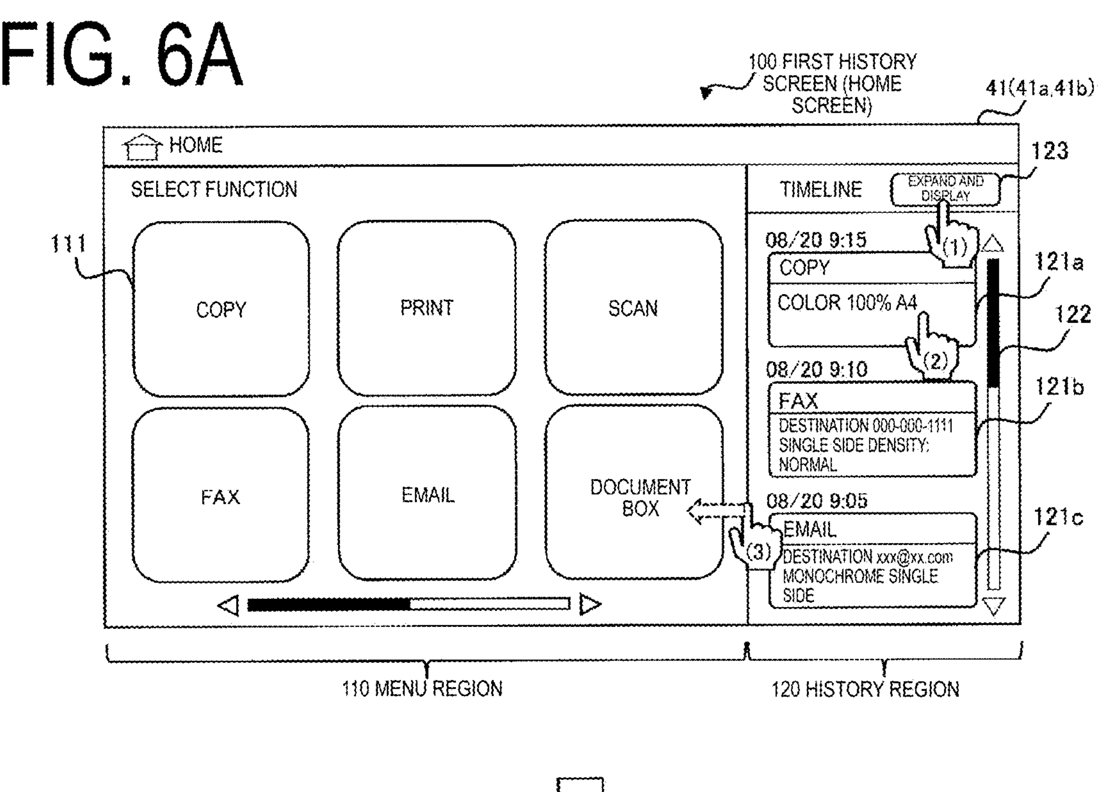

FIG. 6B

200 SECOND HISTORY SCREEN

41(41a,41b)

TIMELINE
EXPAND AND DISPLAY

08/20 9:15 121a
COPY
COLOR 100% A4

08/19 17:00 121d
COPY
MONOCHROME 100% A4

08/19 14:00 121g
SCAN
COLOR 100% A4

08/18 16:15 121j
FAX
DESTINATION 000-000-1111 SINGLE SIDE DENSITY: NORMAL

08/20 9:10 121b
FAX
DESTINATION 000-000-1111 SINGLE SIDE DENSITY: NORMAL

08/19 16:00 121e
COPY
COLOR 100% A4

08/19 13:00 121h
FAX
DESTINATION 000-000-2222 SINGLE SIDE DENSITY: NORMAL

08/18 15:15 121k
SCAN
MONOCHROME 100% A4

08/20 9:05 121c
EMAIL
DESTINATION xxx@xx.com MONOCHROME SINGLE SIDE

08/19 15:00 121f
COPY
COLOR 100% A4

08/18 17:15 121i
COPY
MONOCHROME 100% A4

08/18 14:15 121l
COPY
COLOR 100% A4

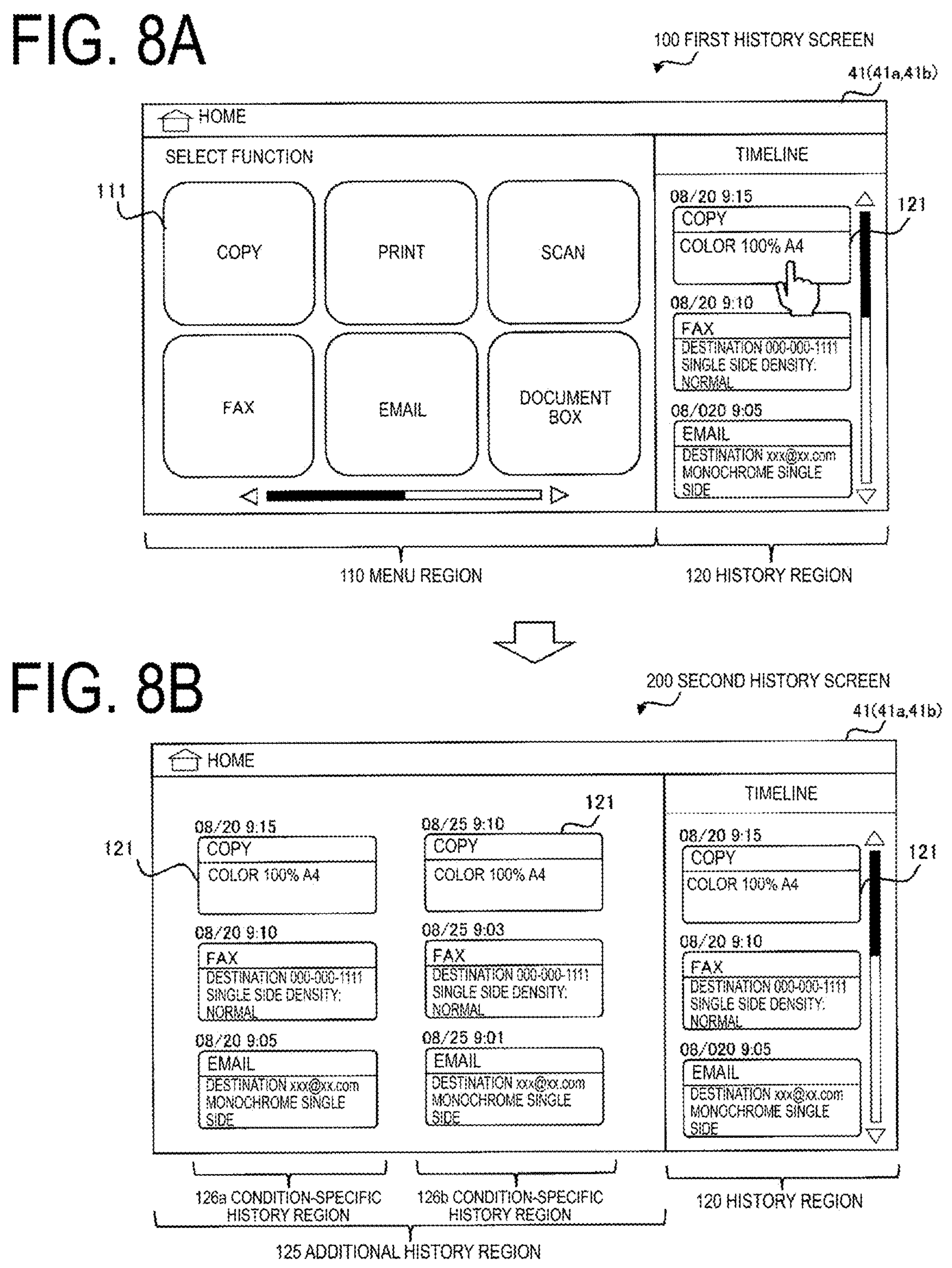

FIG. 8A
100 FIRST HISTORY SCREEN
41(41a,41b)
HOME
SELECT FUNCTION
111
COPY
PRINT
SCAN
FAX
EMAIL
DOCUMENT BOX
TIMELINE
08/20 9:15
COPY
COLOR 100% A4
121
08/20 9:10
FAX
DESTINATION 000-000-1111 SINGLE SIDE DENSITY: NORMAL
08/020 9:05
EMAIL
DESTINATION xxx@xx.com MONOCHROME SINGLE SIDE
110 MENU REGION
120 HISTORY REGION
FIG. 8B
200 SECOND HISTORY SCREEN
41(41a,41b)
HOME
08/20 9:15
COPY
COLOR 100% A4
121
08/20 9:10
FAX
DESTINATION 000-000-1111 SINGLE SIDE DENSITY: NORMAL
08/20 9:05
EMAIL
DESTINATION xxx@xx.com MONOCHROME SINGLE SIDE
08/25 9:10
121
COPY
COLOR 100% A4
08/25 9:03
FAX
DESTINATION 000-000-1111 SINGLE SIDE DENSITY: NORMAL
08/25 9:01
EMAIL
DESTINATION xxx@xx.com MONOCHROME SINGLE SIDE
TIMELINE
08/20 9:15
COPY
COLOR 100% A4
121
08/20 9:10
FAX
DESTINATION 000-000-1111 SINGLE SIDE DENSITY: NORMAL
08/020 9:05
EMAIL
DESTINATION xxx@xx.com MONOCHROME SINGLE SIDE
126a CONDITION-SPECIFIC HISTORY REGION
126b CONDITION-SPECIFIC HISTORY REGION
120 HISTORY REGION
125 ADDITIONAL HISTORY REGION

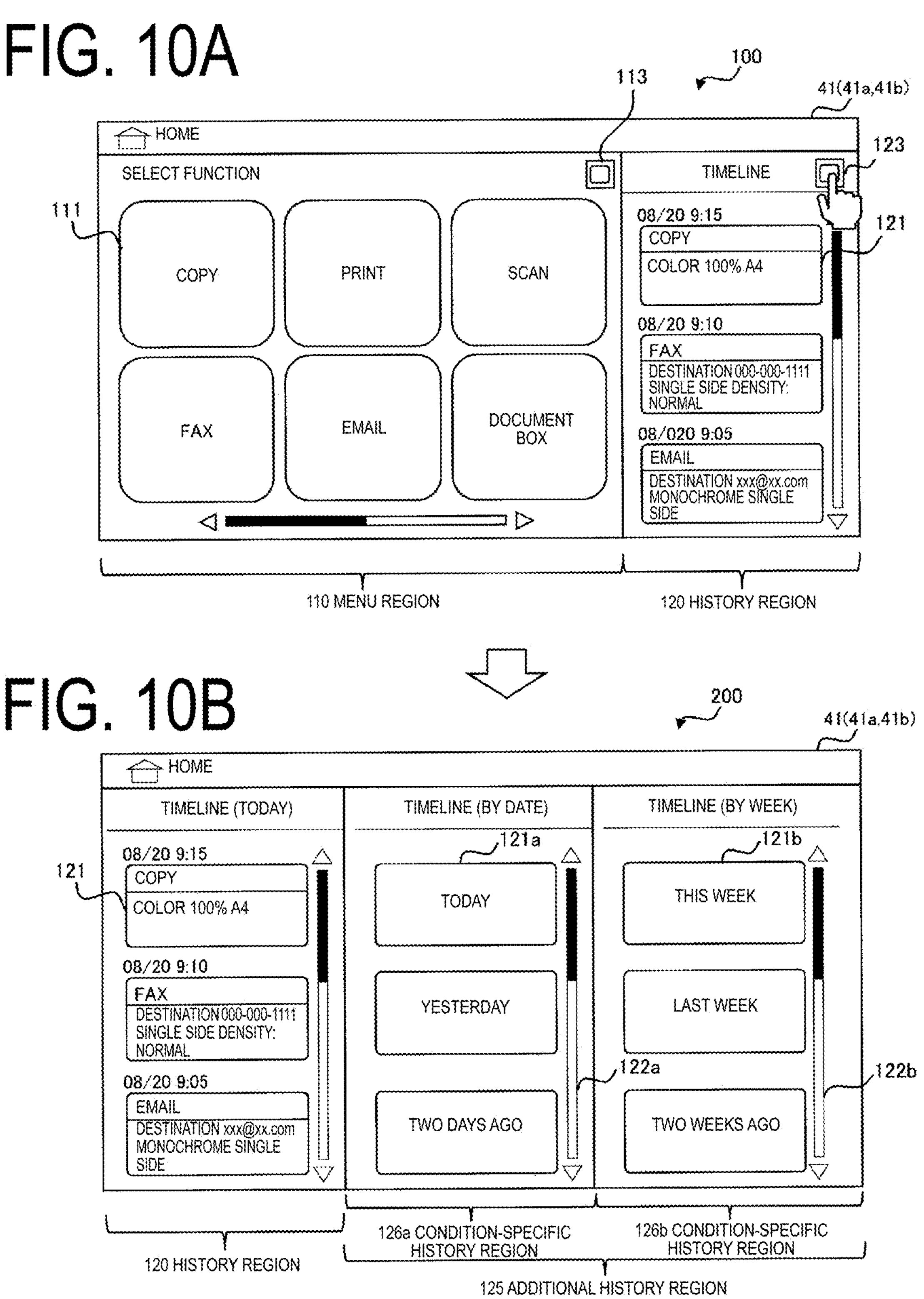
FIG. 10A
100
113
41(41a,41b)
HOME
123
SELECT FUNCTION
TIMELINE
111
08/20 9:15
COPY
121
COLOR 100% A4
COPY
PRINT
SCAN
08/20 9:10
FAX
DESTINATION 000-000-1111
SINGLE SIDE DENSITY:
NORMAL
FAX
EMAIL
DOCUMENT BOX
08/020 9:05
EMAIL
DESTINATION xxx@xx.com
MONOCHROME SINGLE SIDE
110 MENU REGION
120 HISTORY REGION
FIG. 10B
200
41(41a,41b)
HOME
TIMELINE (TODAY)
TIMELINE (BY DATE)
TIMELINE (BY WEEK)
121a
121b
121
08/20 9:15
COPY
COLOR 100% A4
TODAY
THIS WEEK
08/20 9:10
FAX
DESTINATION 000-000-1111
SINGLE SIDE DENSITY:
NORMAL
YESTERDAY
LAST WEEK
122a
122b
08/20 9:05
EMAIL
DESTINATION xxx@xx.com
MONOCHROME SINGLE SIDE
TWO DAYS AGO
TWO WEEKS AGO
120 HISTORY REGION
126a CONDITION-SPECIFIC HISTORY REGION
126b CONDITION-SPECIFIC HISTORY REGION
125 ADDITIONAL HISTORY REGION HOME
[EXPAND TIMELINE (1) (2)]
SELECT FUNCTION
COPY
PRINT
SCAN
FAX
EMAIL
DOCUMENT BOX
TIMELINE
08/20 9:15
COPY
COLOR 100% A4
08/20 9:10
FAX
08/020 9:05
EMAIL
110 MENU REGION
120 HISTORY REGION TIMELINE (1)
[TO (2)]
[RETURN]⇒
08/19 15:15
MONOCHROME 100% A4
08/19 14:30
08/19 14:10

TIMELINE (2)
[TO (1)]
100
111
121
123a
123b
124a
124b
124c
124d
200

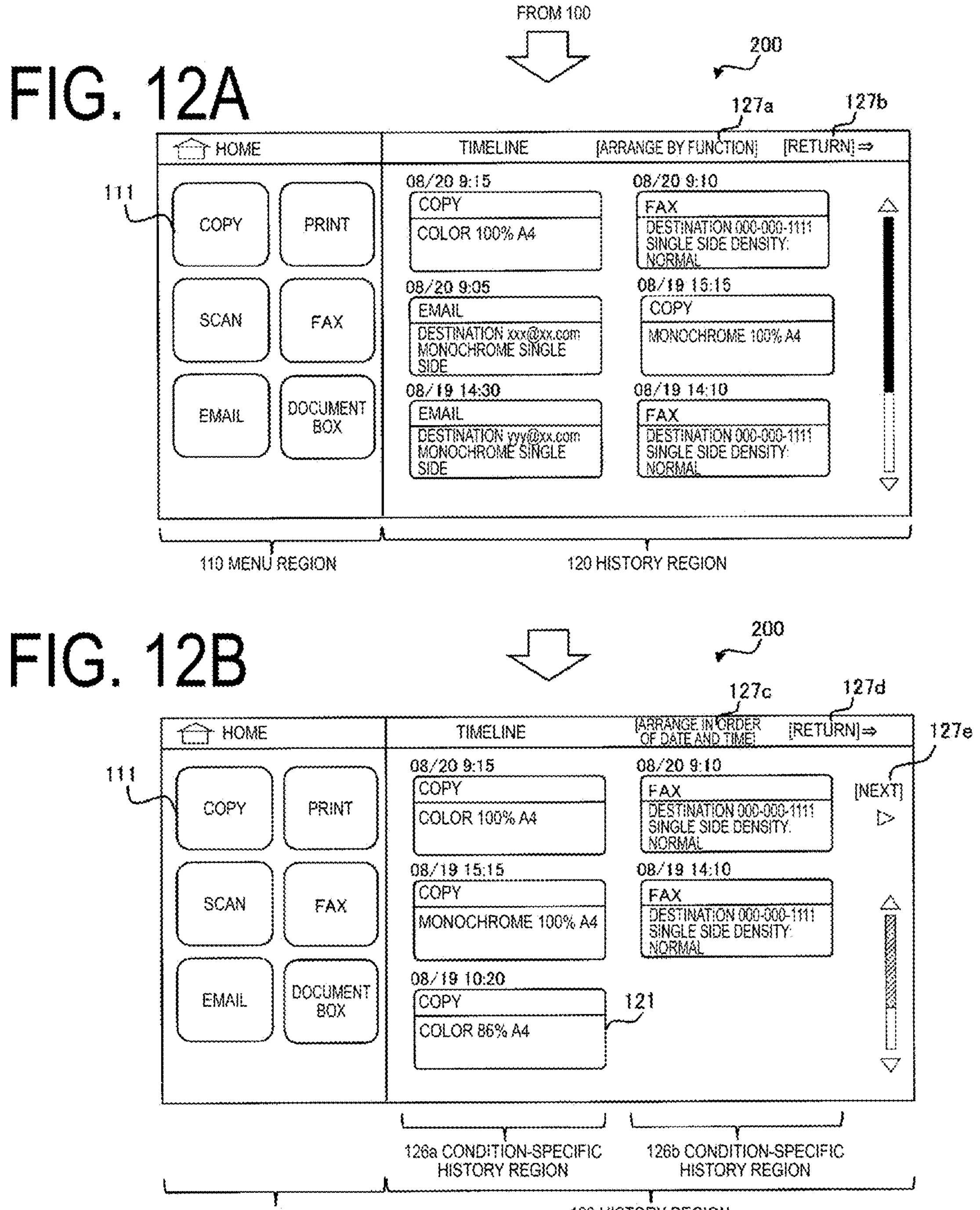

FROM 100
FIG. 12A
200
127a
127b
HOME
TIMELINE
[ARRANGE BY FUNCTION]
[RETURN]⇒
111
COPY
PRINT
SCAN
FAX
EMAIL
DOCUMENT BOX
08/20 9:15
COPY
COLOR 100% A4
08/20 9:10
FAX
DESTINATION 000-000-1111 SINGLE SIDE DENSITY: NORMAL
08/20 9:05
EMAIL
DESTINATION xxx@xx.com MONOCHROME SINGLE SIDE
08/19 15:15
COPY
MONOCHROME 100% A4
08/19 14:30
EMAIL
DESTINATION yyy@xx.com MONOCHROME SINGLE SIDE
08/19 14:10
FAX
DESTINATION 000-000-1111 SINGLE SIDE DENSITY: NORMAL
110 MENU REGION
120 HISTORY REGION
FIG. 12B
200
127c
127d
127e
HOME
TIMELINE
[ARRANGE IN ORDER OF DATE AND TIME]
[RETURN]⇒
[NEXT]
111
COPY
PRINT
SCAN
FAX
EMAIL
DOCUMENT BOX
08/20 9:15
COPY
COLOR 100% A4
08/20 9:10
FAX
DESTINATION 000-000-1111 SINGLE SIDE DENSITY: NORMAL
08/19 15:15
COPY
MONOCHROME 100% A4
08/19 14:10
FAX
DESTINATION 000-000-1111 SINGLE SIDE DENSITY: NORMAL
08/19 10:20
COPY
COLOR 86% A4
121
126a CONDITION-SPECIFIC HISTORY REGION
126b CONDITION-SPECIFIC HISTORY REGION
110 MENU REGION
120 HISTORY REGION

IMAGE PROCESSING APPARATUS, CONTROL METHOD, AND PROGRAM

RELATED APPLICATIONS

The present application is a continuation based on PCT Application No. PCT/JP2022/026813, filed on Jul. 6, 2022. The content of which is incorporated by reference herein in their entirety.

TECHNICAL FIELD

The present disclosure relates to an image processing apparatus, a control method, and a program.

BACKGROUND OF INVENTION

Patent Document 1 discloses an image processing apparatus including an operation panel that displays, in juxtaposition, a menu region in which function buttons corresponding to types of image processing are arranged and a history region in which history buttons corresponding to image processing completed in the past (hereinafter referred to as "completed image processing") are arranged. In such an image processing apparatus, setting contents for the image processing corresponding to the history button are reproduced in response to the reception of the user operation of selecting the history button, and thus the time and effort can be saved that are required for the user to input the setting contents.

CITATION LIST

Patent Literature

Patent Document 1: JP 2021-175020 A

SUMMARY

The image processing apparatus as described above has room for improvement in terms of further enhancing convenience for a user who uses the history button.

The present disclosure provides an image processing apparatus, a control method, and a program that are capable of further improving convenience for a user.

In a first aspect of the present disclosure, an image processing apparatus executes a plurality of functions related to image processings. The image processing apparatus includes an operation panel and a controller. The operation panel includes a display configured to display a first history screen on which a menu region and a history region are arranged. In the first region, function buttons corresponding to a plurality of functions are arranged. In the history region, history buttons corresponding to completed image processings are arranged. The controller is configured to control the display to switch from the first history screen to a second history screen on which the history region is expanded, in response to user operation on the operation panel.

In a second aspect of the present disclosure, a control method is for controlling an image processing apparatus for executing a plurality of functions related to image processings. The control method includes: displaying, on an operation panel, a first history screen on which a menu region and a history region are arranged, the menu region including function buttons arranged therein, the function buttons corresponding to a plurality of functions, the history region including history buttons arranged therein, the history buttons corresponding to completed image processings; and switching from the first history screen to a second history screen on which the history region is expanded, in response to user operation on the operation panel.

In a third aspect of the present disclosure, a program causes an image processing apparatus for executing a plurality of functions related to image processings to execute: displaying, on an operation panel, a first history screen on which a menu region and a history region are arranged, the menu region including function buttons arranged therein, the function buttons corresponding to a plurality of functions, the history region including history buttons therein, the history buttons corresponding to completed image processings; and switching from the first history screen to a second history screen on which the history region is expanded, in response to user operation on the operation panel.

BRIEF DESCRIPTION OF THE DRAWINGS

FIGS. 6A and 6B are diagrams illustrating an example of expansion operation in the history region according to the embodiment.

FIGS. 8A and 8B are diagrams for illustrating a first variation of the expansion operation in the history region according to the embodiment.

FIGS. 10A and 10B are diagrams for illustrating an example of a trigger for switching to a second history screen according to a second variation.

FIGS. 12A and 12B are diagrams for illustrating a fourth variation of the expansion operation in the history region according to the embodiment.

DESCRIPTION OF EMBODIMENTS

An image processing apparatus according to an embodiment will be described with reference to the drawings. In the description of the drawings, the same or similar parts are denoted by the same or similar reference signs.

Configuration of Image Processing Apparatus

Figure 1:
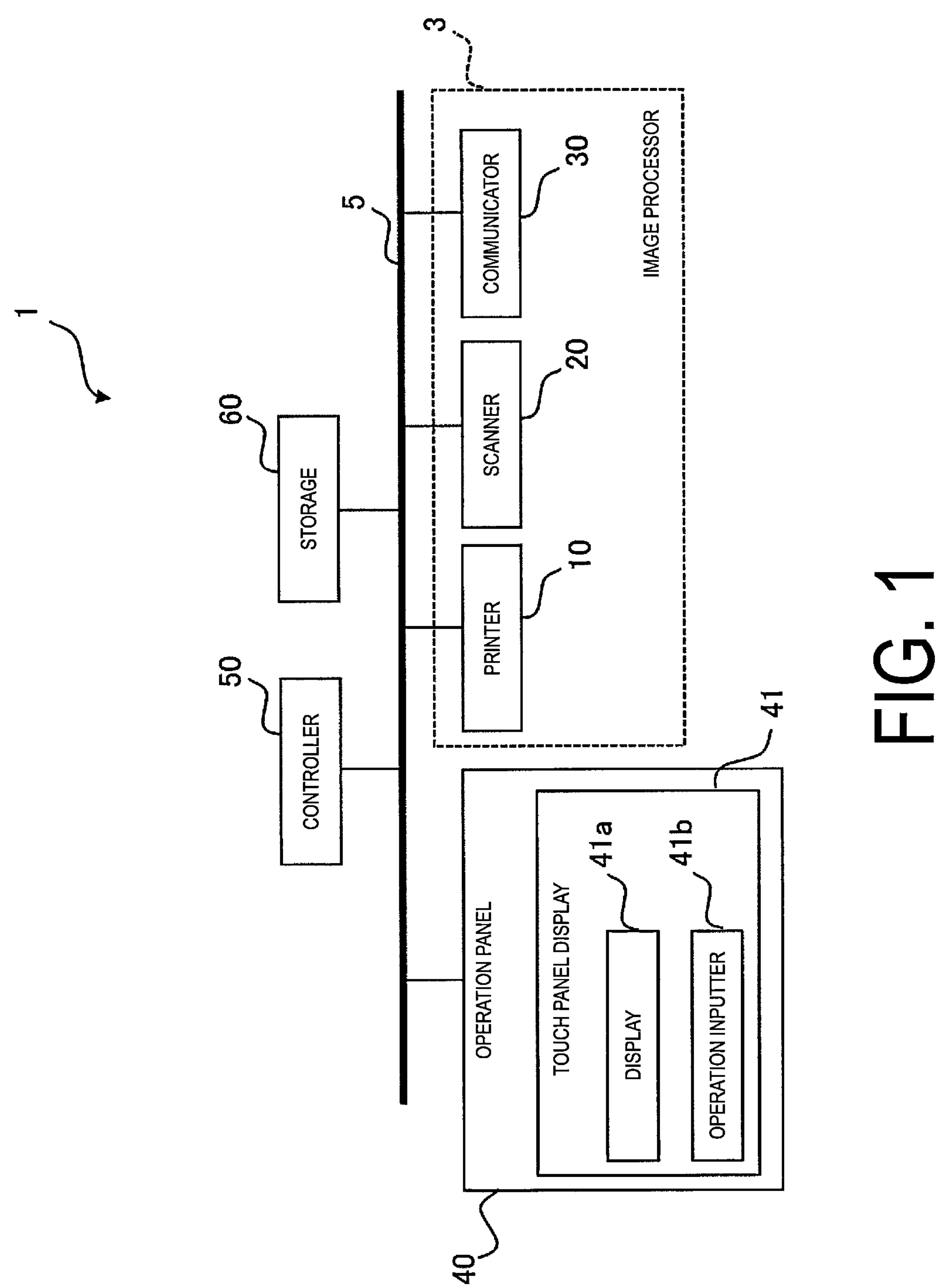
FIG. 1 is a diagram illustrating a functional block configuration of an image processing apparatus according to an embodiment.
Figure 2:
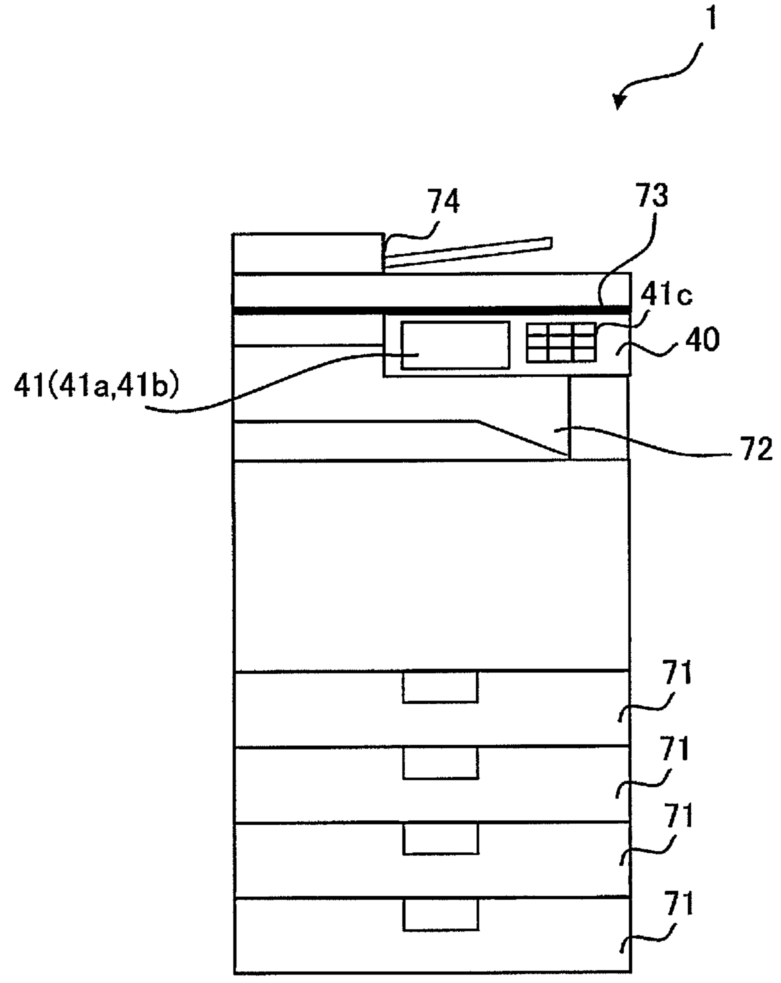
FIG. 2 is a diagram illustrating an outer appearance configuration example of the image processing apparatus according to the embodiment.

First, a configuration of the image processing apparatus according to the embodiment will be described. FIG. 1 is a diagram illustrating a functional block configuration of an image processing apparatus 1 according to the embodiment. FIG. 2 is a diagram illustrating an outer appearance configuration example of the image processing apparatus 1 according to the embodiment. Note that the "image" may include only characters. A format of the "image data" may be various, and may be, for example, a vector format or a raster format. In the description of the present embodiment, "image" and "image data" may not be strictly distinguished from each other for the sake of convenience. The "image data" may be converted into an appropriate format in the course of the image processing.

As illustrated in FIG. 1, the image processing apparatus 1 includes a printer 10, a scanner 20, a communicator 30, an operation panel 40, a controller 50, and a storage 60. The image processing apparatus 1 has a configuration capable of performing one or more types of image processing. The embodiment is provided with the printer 10, the scanner 20, and the communicator 30, as a configuration for performing image processing. The printer 10, the scanner 20, and the communicator 30 constitute an image processor 3. However, the image processing apparatus 1 may include only one of the printer 10 and the scanner 20, or need not include the communicator 30.

In the embodiment, types of image processing executed by the image processor 3 include "print", "copy", "scan", and "facsimile (FAX)". In other words, the image processing apparatus 1 has functions of "print", "copy", "scan", and "FAX".

"Copy" is a function of using the printer 10 to print, on a sheet, an image scanned by the scanner 20. "Print" is a function of using the printer 10 to print an image based on data received by the communicator 30 from outside or an image based on data stored in a recording medium (not illustrated) connected to the image processing apparatus 1. "Scan" is a function of storing, as data, an image scanned by the scanner 20. For example, a storage destination is an auxiliary storage apparatus (a non-volatile memory from another viewpoint) included in the storage 60, a storage medium connected to the image processing apparatus 1, or another device that performs communication with the image processing apparatus 1 via the communicator 30. "FAX" refers to a function in which the printer 10 prints, on a sheet, data received by the communicator 30 from outside via a telephone line, and a function in which the communicator 30 transmits image data scanned by the scanner 20 to outside via the telephone line.

The image processor 3 need not support all of these functions. The image processor 3 may support only one or only two of the functions of "print", "copy", "scan", and "FAX", for example. The image processor 3 may further support an "email" function. "Email" is a function of performing setting and/or execution related to email. With this function, for example, a part or all of contents of an email received by the communicator 30 may be printed by the printer 10, or data of an image scanned by the scanner 20 may be transmitted by the communicator 30 via email.

The printer 10 performs image printing under control of the controller 50. For example, the printer 10 performs printing on a sheet arranged on a sheet feed tray 71 illustrated in FIG. 2, and discharges a printed sheet to a sheet discharge tray 72. The printer 10 may include only one sheet feed tray 71 or may include a plurality of sheet feed trays 71. A plurality of sheet feed trays 71 can accommodate, for example, sheets of different sizes. From another viewpoint, the printer 10 may have a function of selecting a size of a sheet. The printer 10 may be configured to enable color (as well as monochrome and grayscale) printing.

The scanner 20 performs image scanning under control of the controller 50, and generates image data. Specifically, the scanner 20 takes an image of (scans) a document set on a document table 73 or an auto document feeder (ADF) 74 illustrated in FIG. 2 by an imaging device that moves along a document glass to generate image data.

The communicator 30 performs image data communication under the control of the controller 50. Specifically, the communicator 30 realizes communication between the image processing apparatus 1 and another device. Examples of such another device include a personal computer (PC), a mobile terminal (such as a smartphone), another image processing apparatus, and a server. Examples of the server include a file server, an email server, and a Web server. The communication may be directly performed with another device, or may be indirectly performed via a network. Examples of the network include a telephone network, the Internet, a private network, and a local area network (LAN). The communication may be wired communication or wireless communication.

The operation panel 40 constitutes an operation inputter that receives a user operation (user input). The operation panel 40 includes a touch panel display 41. As illustrated in FIG. 2, the operation panel 40 may include one or more physical buttons 41*c*. The touch panel display 41 includes a display 41*a* that displays an image under the control of the controller 50 and an operation inputter 41*b* that receives a user operation (for example, a touch operation) on the display 41*a*. For example, the display 41*a* includes a liquid crystal display or an organic electro luminescence (EL) display. These displays include a relatively large number of pixels regularly arranged, and can display an image including any shape based on image data. The display 41*a* may be capable of displaying a color image. The operation inputter 41*b* detects a position of a touch operation on the display 41*a*, and outputs detection results to the controller 50. The operation inputter 41*b* may include a touch panel that overlaps the display 41*a* and an analog-to-digital (A/D) converter that performs analog-to-digital (A/D) conversion on an output of the touch panel. In the description of the embodiment, terms indicating specific modes such as "press", "touch", and "tap" may be used for "user operation" on the operation inputter 41*b* for the sake of simplicity, but these terms may be generalized as "predetermined operation".

The controller 50 includes one or more processors, and controls the entire image processing apparatus 1. The controller 50 executes various types of processings by executing a program stored in the storage 60. The controller 50 controls operations of the printer 10, the scanner 20, the communicator 30, and the operation panel 40. For example, upon receiving an operation (instruction) from the user via the operation panel 40, the controller 50 executes processing corresponding to operation details. The operation panel 40 displays various operation screens on the touch panel display 41 in accordance with instructions from the controller 50. Note that the controller 50 may include a logic circuit configured to perform only a certain operation.

For example, the storage 60 includes various memories such as a Read Only Memory (ROM), a Random Access Memory (RAM), and an auxiliary storage apparatus. Note that a combination of the controller 50 and the storage 60 may be considered as a computer. The program to be executed by the controller 50 is stored in the ROM and/or the auxiliary storage apparatus of the storage 60, for example. In the embodiment, the storage 60 stores, for each image processing completed by the image processor 3, history information in which the date and time when the image processing has been executed, the type of the image processing, the setting contents in the image processing, and the name of the user who performed the image processing (user name corresponding to the image processing) are associated with one another. The history information stored in the storage 60 is used for history display to be described later.

The printer 10, the scanner 20, the communicator 30, the operation panel 40, the controller 50, and the storage 60 are connected by a bus 5, for example. In FIG. 1, all of the components are schematically connected to one bus 5, but a plurality of buses may be present. For example, an address bus, a data bus, and a control bus may be provided.

Note that, as an outer appearance of the image processing apparatus 1, FIG. 2 illustrates an outer appearance of a multi-function printer for business use. However, the image processing apparatus 1 may be used in any manner. For example, the image processing apparatus 1 may be installed in a user's home for family or personal use, or may be installed in a company and used by a plurality of specific users, or may be installed in a store, such as a supermarket or a convenience store, and used by many and unspecified users.

Screen Display Operation on Operation Panel

Figure 3:
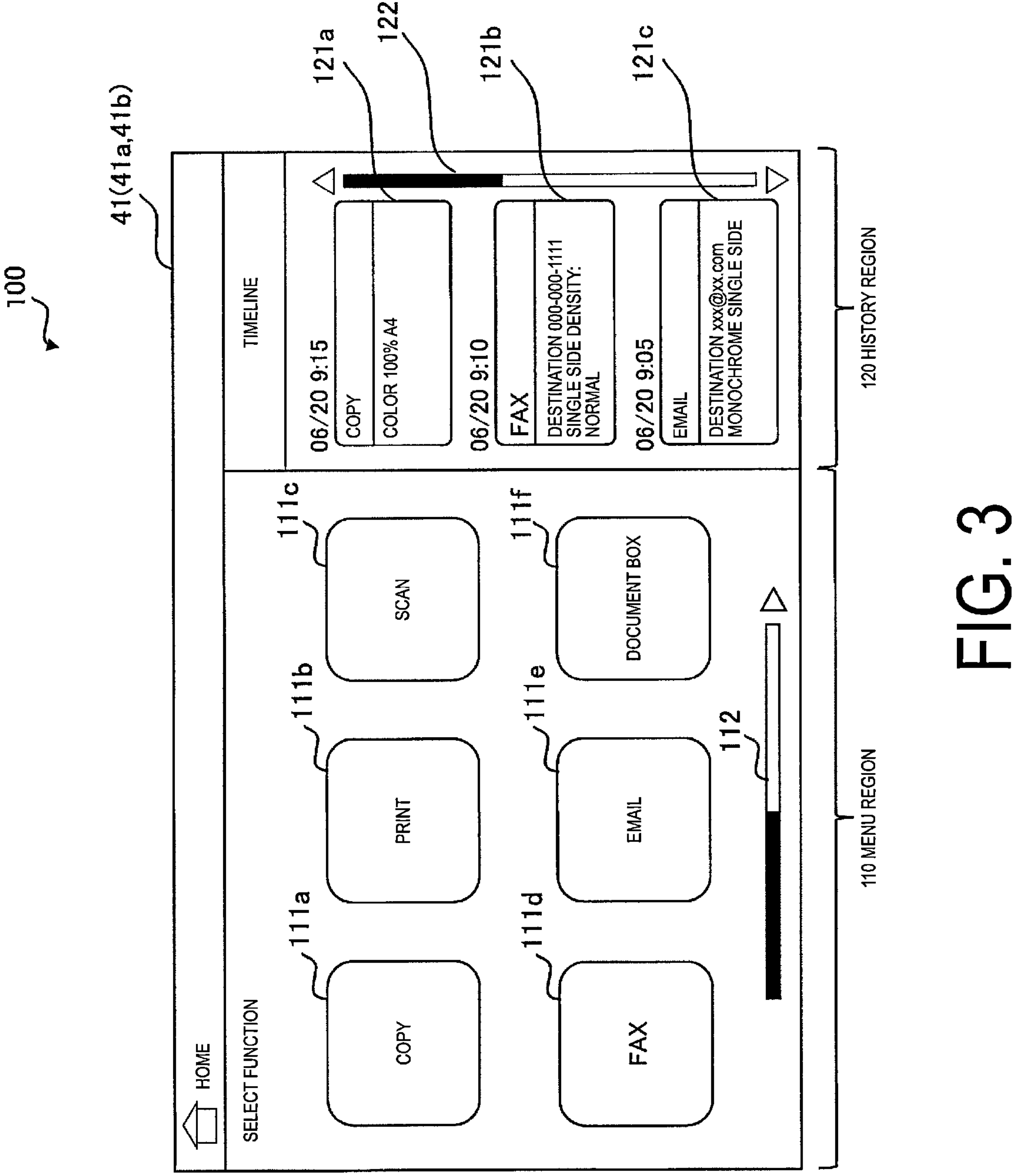
FIG. 3 is a diagram illustrating an example of a home screen displayed in a display of an operation panel according to the embodiment.

Screen display operation on the operation panel 40 according to the embodiment will be described. FIG. 3 is a diagram illustrating an example of a home screen 100 displayed on the display 41*a* of the touch panel display 41 of the operation panel 40 according to the embodiment. The home screen 100 is an example of a first history screen. The home screen 100 is, for example, a screen displayed when the user starts using the image processing apparatus 1. From another point of view, the home screen 100 is a screen that is started up when the image processing apparatus 1 is powered on, when the image processing apparatus 1 returns from the sleep mode, and/or when user authentication is successful in the image processing apparatus 1.

As illustrated in FIG. 3, a menu region 110 and a history region 120 are displayed in juxtaposition on the home screen 100. In the embodiment, the menu region 110 and the history region 120 are configured by dividing the home screen 100 into two parts in the horizontal direction. Note that the menu region 110 may be referred to as a main display region. The history region 120 may be referred to as a timeline region.

In the menu region 110, a plurality of function buttons 111 (111*a* to 111*f*) corresponding to types of image processings are arranged. On the other hand, in the history region 120, a plurality of history buttons corresponding to completed image processings are arranged. Here, each history button displayed in the history region 120 is a history button 121 (121*a* to 121*c*) individually displaying information of completed image processing for each image processing. That is, each history button 121 is associated with completed image processing (specifically, a completed image processing job). Note that the information displayed on the button may be text or a symbol image. The button need not mimic a physical button. For example, a button may be indicated only by text and/or a symbol image and need not have a frame border surrounding the text and/or the symbol image. From another point of view, the boundary between the region for receiving the user's operation and the surrounding region need not be represented by a frame border or a difference in color.

The menu region 110 includes a plurality of function buttons 111 (111*a*, 111*b*, . . . ) corresponding to types of image processings (in the example of FIG. 3, "copy", "print", "scan", "FAX", "email", and "document box"). The menu region 110 may be scrollable by a scroll bar 112. In the illustrated example, the scroll direction is the horizontal direction. However, the scroll direction may be the vertical direction.

The number of function buttons 111 and the types of functions corresponding to the function buttons 111 may be set as appropriate. Note that, hereinafter, the function button 111 may be referred to by the text displayed in the function button 111. The above applies to other buttons in the same and/or similar manner. In FIG. 3, a copy button 111*a*, a print button 111*b*, a scan button 111*c*, a FAX button 111*d*, an email button 111*e*, and a document box button 111*f* are illustrated as the function buttons 111.

When any one of the function buttons 111 in the menu region 110 of the home screen 100 is tapped, the controller 50 controls the display 41*a* to switch the screen displayed on the display 41*a* to a screen for performing an operation related to the function corresponding to the tapped function button 111. For example, when the copy button 111*a* is tapped, the controller 50 switches from the home screen 100 to a copy screen 130 illustrated in FIG. 4.

Figure 4:
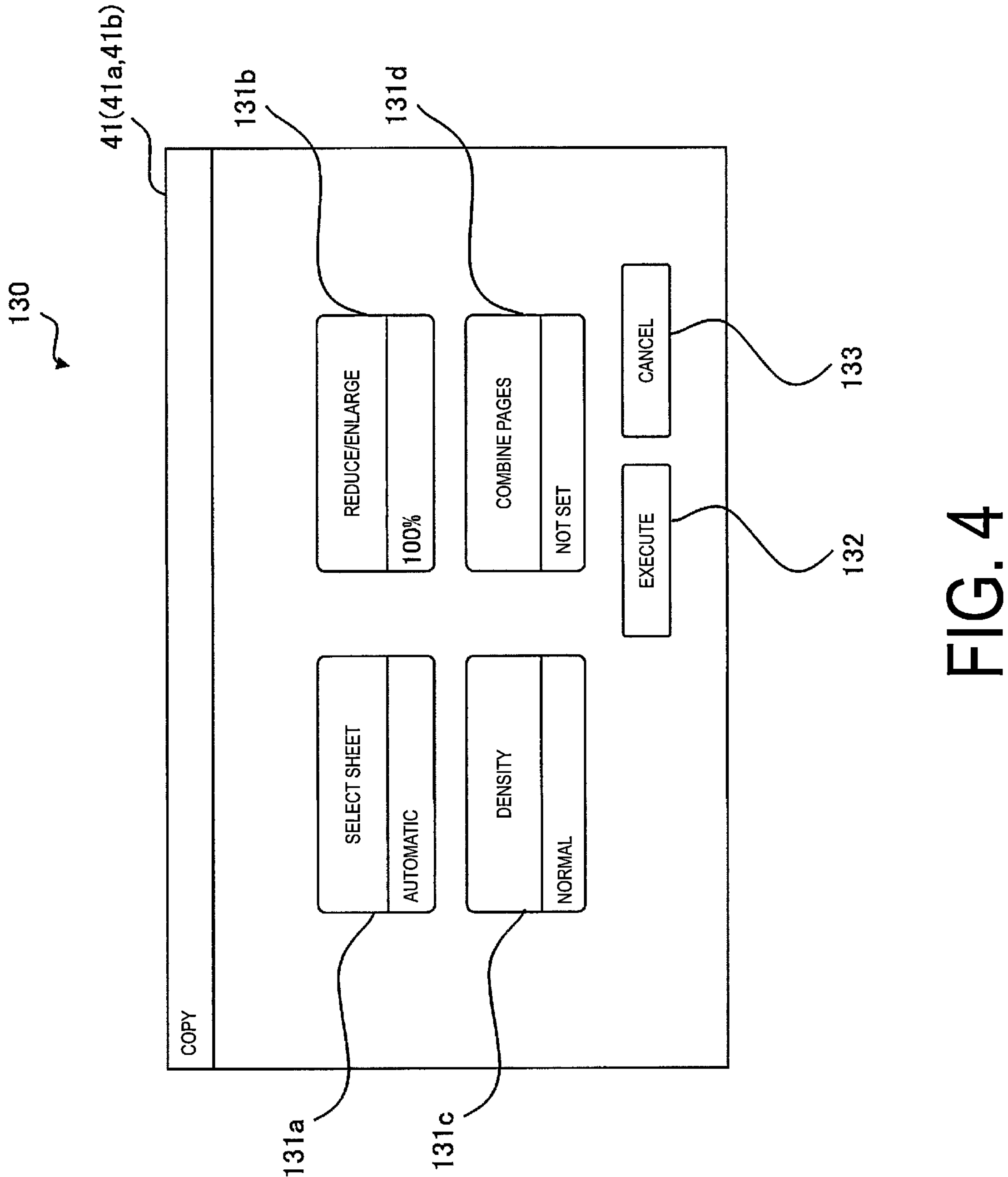
FIG. 4 is a diagram illustrating an example of a copy screen according to the embodiment.

The copy screen 130 illustrated in FIG. 4 includes a plurality of setting buttons 131 (131*a*, 131*b*, . . . ) for setting conditions of image processing (here, copy conditions), an execution button 132 for instructing execution of copying, and a cancel button (return button from another viewpoint) 133 for returning to the home screen 100. The number and types of the setting buttons 131 are freely selected. In the example of FIG. 4, the setting buttons 131 include a "select sheet" button 131*a*, an "enlarge/reduce" button 131*b*, a "density" button 131*c*, and a "combine pages" button 131*d*. Since these are common buttons, description thereof will be omitted. The controller 50 sets copy conditions according to operations on the setting buttons 131. Then, when the execution button 132 is tapped, the controller 50 controls the image processor 3 to execute copying. When the button for returning to the home screen 100 is tapped or a certain period of time elapses, the controller 50 controls the display 41*a* to switch from the copy screen 130 to the home screen 100.

Note that, unlike the above description, the controller 50 may control the image processor 3 to execute image processing (for example, copying) when the function button 111 is tapped. The conditions for the image processing (for example, the setting contents of copying) may be set on a dedicated screen for setting the processing conditions, the dedicated screen being displayed by tapping the dedicated function button 111 for setting the conditions.

In contrast, the history region 120 illustrated in FIG. 3 is a display region indicating a history of image processing executed in the past. The position, shape, and area of the history region 120 are freely selected. In the example of FIG. 3, the history region 120 is located on one side (right side in the illustrated example) in the horizontal direction on the home screen 100. The home screen 100 has a rectangular shape with the horizontal direction defined as the longitudinal direction. The history region 120 has a rectangular shape with the vertical direction defined as the longitudinal direction. The width of the history region 120 is less than half or less than one-third of the width of the home screen 100. Note that most (for example, 80% or more) of the home screen 100 except for the history region 120 is the menu region 110. The history region 120 may be scrollable by a scroll bar 122. Although an example in which the scroll direction is the vertical direction is illustrated, the scroll direction may be the horizontal direction.

The maximum number of history buttons 121 that can be displayed by scrolling in the history region 120 is determined in advance. For example, in the history region 120, the history buttons 121 for up to the latest n jobs (n≥2) among the completed image processing jobs can be displayed by scrolling. In the example of FIG. 3, the number of history buttons 121 that can be displayed at a time in the history region 120 is three. However, the number of history buttons 121 that can be displayed at a time in the history region 120 may be two or four.

The plurality of history buttons 121 (121$a$, 121$b$, . . . ) are arranged in a line in a predetermined direction in the order of the date and time when the image processing corresponding to the history button 121 has been executed (that is, in chronological order). The plurality of history buttons 121 may be arranged in any direction. The plurality of history buttons 121 may be arranged from one side to the other side in the arrangement direction (from the upper side to the lower side in the illustrated example) in reverse chronological order (in the illustrated example) or in chronological order, or may be switched between reverse chronological order and chronological order by performing a predetermined operation on the operation panel 40. Note that, in the description of the present embodiment, the history buttons 121 are assumed to be arranged in reverse chronological order for the sake of convenience. Specifically, the history button 121$a$ corresponding to the latest completed image processing is arranged on the uppermost side, and the history button 121$n$ corresponding to an n-th job being the oldest completed image processing is arranged on the lowermost side.

When image processing is executed via an operation on the function button 111 or an operation on the history button 121, the controller 50 adds a new history button 121 related to the image processing. When the image processing based on which the history button 121 is added is the same as the new image processing performed via the operation on the history button 121, the history button 121 may be newly added, or the execution date and time of the image processing corresponding to the operated history button 121 may be only updated (from another viewpoint, the display position of the history button 121 is changed). Here, the same image processings may mean, for example, that the image processings are the same except for the execution date and time. Note that, for image processing executed via an operation on the history button 121, unlike the description of the present embodiment, the history button 121 need not be added.

The type of image processing for which the history button 121 is generated is freely selected. For example, even when the image processing apparatus 1 has the six functions illustrated in the menu region 110, the history button 121 need not be generated for all of the functions. For example, the history button 121 may be generated only for image processings in which printing is performed by the image processing apparatus 1, such as “copy” and “print” (and printing in “box”). For example, the history button 121 may be generated only for image processings in which scanning is performed by the image processing apparatus 1, such as “copy”, “scan”, “FAX”, and “email”. For example, the history button 121 may be generated only for image processings in which communication is not performed, such as “copy”, “print”, and “scan” (and printing in “box”).

For image processings performed by transmitting a signal including a print job or the like from another device (for example, a PC) to the communicator 30, the history button 121 may be added or need not be added. When the history button 121 is added, reprinting can be performed via the history button 121, for example, when a user who has transmitted a print job from a PC to the image processing apparatus 1 confirms a failure in printing in front of the image processing apparatus 1.

As described above, the number of history buttons 121 (including those displayed by scrolling) that can be displayed in the history region 120 is limited to a predetermined upper limit value (n) or less. Therefore, when the history buttons 121 are added, the number of history buttons 121 reaches the upper limit value, and then a further new history button 121 is added, the oldest history button 121 is deleted. In other words, the oldest history button 121 cannot be displayed. Note that a specific value of the upper limit value (n) is freely selected, and is, for example, 5, 10, or 20. The upper limit value may be set by the manufacturer of the image processing apparatus 1 and may be unchangeable by the administrator or the user of the image processing apparatus 1, or may be settable by the administrator of the image processing apparatus 1. In an aspect in which the display mode of the history region 120 can be varied for each user, the upper limit value may be settable by the user.

Each history button 121 includes (indicates) information of the corresponding image processing. Examples of the information include the date and time at which the image processing was executed, the type of the image processing, the condition (setting contents) of the image processing, and the name of the user who performed the image processing. Another example is a communication destination (a transmission destination and/or a reception destination) in the FAX function and/or the email function. That is, each history button 121 indicates information of at least one selected from the group consisting of the type of completed image processing, the setting contents of the completed image processing, the processing date and time of the completed image processing, the user name corresponding to the completed image processing, and the transmission destination in the completed image processing. Accordingly, the user can easily identify the corresponding completed image processing based on the information indicated by each history button 121.

Each history button 121 may display at least one or more selected from the group consisting of various pieces of information related to the image processing described above (for example, date and time, type, setting contents, and user name). In an aspect in which the setting contents of the image processing are displayed in the history button 121, the specific setting contents to be displayed may be appropriately selected. In the history button 121$a$ illustrated in FIG. 3, the specific setting contents include color (“color” or “monochrome” is illustrated as an example), magnification (“100%” is illustrated as an example), and a sheet (“A4” or “automatic” is illustrated as an example).

The types of information of image processing included in the history buttons 121 (in other words, items displayed on the history buttons 121) may be the same or different among the history buttons 121. For example, the type of information displayed on the history button 121 may vary depending on the type of image processing. More specifically, the history button 121 in which the type of image processing is copy need not have an item displaying a communication destination, whereas the history button 121 in which the type of image processing is FAX or email may have an item displaying a communication destination.

Figure 5:
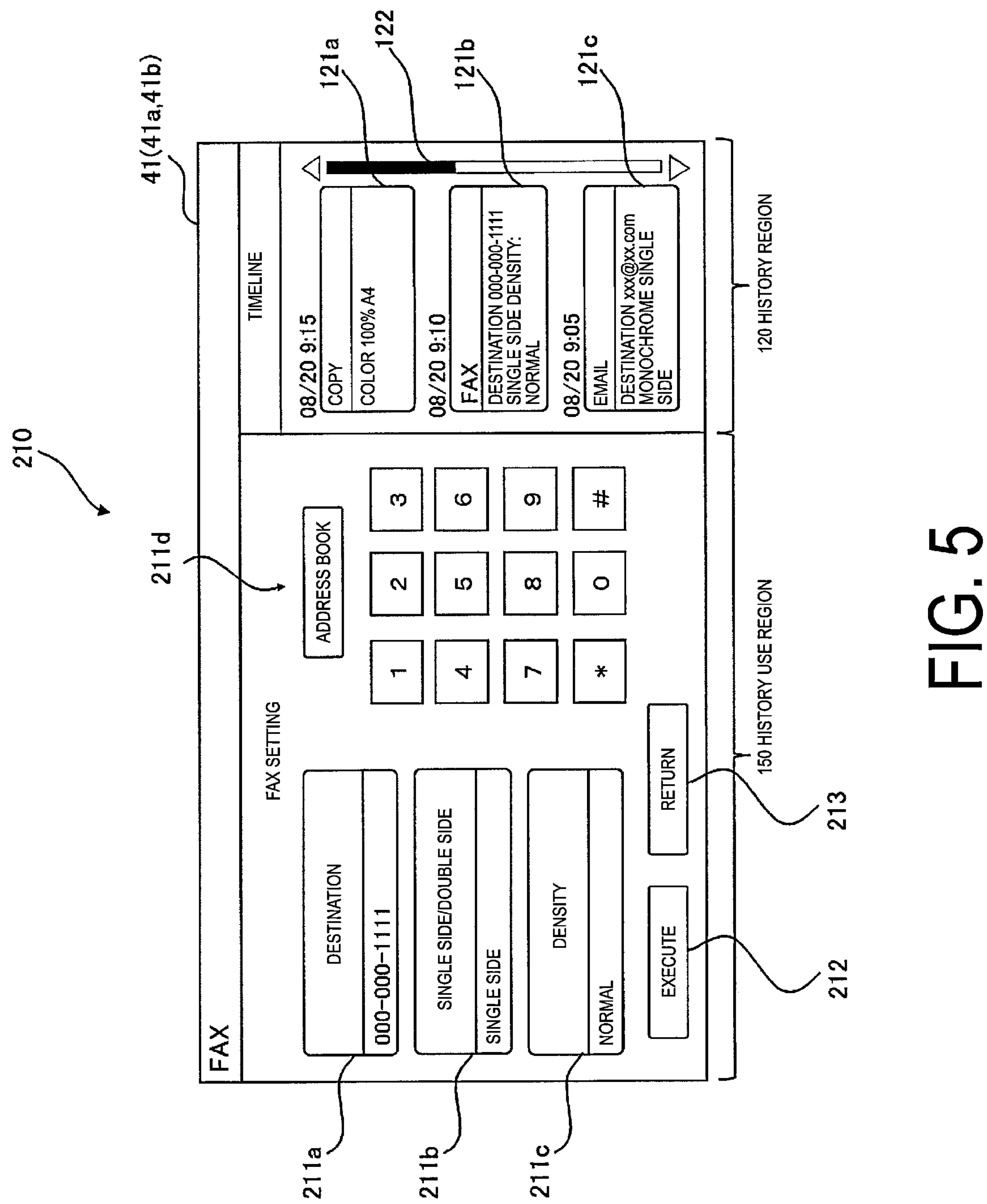
FIG. 5 is a diagram illustrating an example of screen display provided when a history region (history button) is operated according to the embodiment.

When the operation inputter 41*b* receives an operation on any of the history buttons 121 in the history region 120, the controller 50 controls the display 41*a* to switch to a history use screen 210 for using history information corresponding to the received history button 121. FIG. 5 is a diagram illustrating an example of screen display provided when the history region 120 (history button) according to the embodiment is operated. In the example of FIG. 5, the history button 121*b* related to FAX executed in the past is assumed to be operated.

The history use screen 210 illustrated in FIG. 5 is a screen for setting conditions to be currently applied using, as initial values, the conditions (setting contents) for the past image processing corresponding to the operated history button. With the history use screen 210, the user can use the past setting contents to smoothly and quickly set the setting contents to be currently applied. Such a display operation for the history use screen 210 is a common display operation performed when the history region 120 is used. In the example of FIG. 5, the history use screen 210 uses, as the history use region 150, a region corresponding to the menu region 110 on the home screen 100 while maintaining the history region 120.

The history use region 150 includes, for example, a plurality of setting buttons 211 (211*a*, 211*b*, . . . ) for setting the setting contents (here, FAX conditions), an execution button 212 for instructing execution of FAX, and a return button 213 for returning to the home screen 100. The setting button 211 displays information indicating the type of the setting item corresponding to the setting button 211. The setting button 211 may display information indicating a setting state of the item corresponding to the setting button 211. In the illustrated example, the type of the setting item is illustrated in the upper portion of the setting button 211, and the current setting state of the item is illustrated in the lower portion of the setting button 211. The number and types of the setting buttons 211 are freely selected. Here, the setting buttons 211 include a destination button 211*a*, a single side/double side button 211*b*, a density button 211*c*, and a destination designation button group 211*d*. Since these are common buttons, description thereof will be omitted. The destination button 211*a*, the single side/double side button 211*b*, and the density button 211*c* display, as initial values, conditions for the FAX executed in the past. When these initial values are used without change, by operating (tapping) the execution button 212, the user can smoothly and quickly realize FAX under the same conditions as the conditions for the FAX executed in the past.

When the conditions are partially changed with respect to the initial values, the user operates the corresponding setting button 211 to partially change the conditions. Then, when the execution button 212 is tapped, the controller 50 controls the image processor 3 to execute FAX under the partially changed conditions. Note that, when the button for returning to the home screen 100 is tapped or a certain time elapses, the controller 50 controls the display 41*a* to switch to the home screen 100. The layout of the various portions described above is freely selected, and FIG. 5 is merely an example.

Note that when the history button 121 is selected on the home screen 100 to transition to the history use screen 210 (immediately after the transition), initial settings of various setting items may be set as appropriate. For example, for the image processing of the same type as the type of the image processing corresponding to the history button 121, the settings used when the image processing corresponding to the history button 121 was performed may be used as the initial settings. Also for other types of image processing, the settings used when the image processing corresponding to the history button 121 has been performed may be used as the initial settings for items common or similar to those of the image processing of the type corresponding to the history button 121. Settable items (for example, processing conditions) vary depending on the type of image processing, and thus the number and types of setting buttons 211 (in other words, setting items) displayed on the history use screen 210 may vary.

Example of Expansion Operation in History Region

An example of expansion operation in the history region 120 according to the embodiment will be described. FIGS. 6A and 6B are diagrams illustrating an example of expansion operation in the history region 120 according to the embodiment.

As illustrated in FIG. 6A, the display 41*a* displays the first history screen (home screen) 100, on which the menu region 110 and the history region 120 are arranged. In the menu region 110, the function buttons 111 corresponding to a plurality of functions are arranged. In the history region 120, the history buttons 121 corresponding to completed image processings are arranged. In response to user operation on the operation panel 40, the controller 50 controls the display 41*a* to switch from the first history screen 100 illustrated in FIG. 6A to a second history screen 200 illustrated in FIG. 6B. On the second history screen 200, the history region 120 is expanded. Thus, the history region 120 can be expanded in response to the user operation, and convenience for the user using the history buttons 121 can be enhanced.

In the illustrated example, the second history screen 200 is a screen including the expanded history region 120 without including the menu region 110. Specifically, the second history screen 200 is a history screen on which the history region 120 is displayed on the full screen. Thus, on the second history screen 200, the history buttons 121 can be arranged on the full screen, and more history buttons 121 can be displayed. Note that operation of switching from the second history screen 200 to the first history screen 100 (i.e., returning to the first history screen 100) may be operation on a "home button (return button)" (not illustrated) included in the second history screen 200.

Alternatively, the second history screen 200 may be a screen including the expanded history region 120 and the menu region 110 shrunk along with expansion of the history region 120. In that case, on the second history screen 200, with more history buttons 121 being allowed to be displayed, user operation on the function buttons 111 in the menu region 110 can also be received. In response to the operation inputter 41*b* receiving user operation of selecting the shrunk menu region 110, the controller 50 may control the display 41*a* to switch from the second history screen 200 to the first history screen 100.

As illustrated in FIG. 6B, the number of history buttons 121 displayed on the second history screen 200 is greater than the number of history buttons 121 displayed on the first history screen 100 illustrated in FIG. 6A. In the illustrated example, the number of history buttons 121 displayed on the first history screen 100 illustrated in FIG. 6A is 3, and the number of history buttons 121 displayed on the second history screen 200 illustrated in FIG. 6B is 12. For the first history screen 100, when a desired history button 121 is not present in three initially displayed history buttons 121*a* to 121*c*, the user needs to scroll the history region 120 to search for the desired history button 121. In contrast, on the second history screen 200, more history buttons 121 are displayed, and thus it is made easier to search for the desired history button 121.

In the example of FIG. 6B, the history buttons 121 for up to 12 latest jobs among the completed image processing jobs can be displayed at a time (i.e., can be displayed without scrolling). A scroll bar may be provided on the second history screen 200, and the history buttons 121 corresponding to the completed image processings older than the 12 latest jobs may be able to be displayed by scrolling. Note that, in the example of FIG. 6B, the history buttons 121*a* to 121*l* include a total of four columns, namely a column consisting of the history buttons 121*a* to 121*c*, a column consisting of the history buttons 121*d* to 121*f*, a column consisting of the history buttons 121*g* to 121*i*, and a column consisting of the history buttons 121*j* to 121*l*. In each column, arrangement is in reverse chronological order from the upper side to the lower side. That is, the history buttons 121 are arranged in reverse chronological order from the upper side to the lower side and a new line is started in the right direction. Thus, the reverse chronological order the same as and/or similar to that on the first history screen 100 can be employed, and operability of the user can be enhanced. Note that, on the second history screen 200, the history buttons 121 may be arranged in reverse chronological order from left to right and a new line may be started in the downward direction.

In the illustrated example, the sizes of the history buttons 121 on the second history screen 200 are equal to the sizes of the history buttons 121 on the first history screen 100. Thus, also on the second history screen 200, an operational feeling on the history buttons 121 the same as and/or similar to that on the first history screen 100 can be maintained. Note that the sizes of the history buttons 121 on the second history screen 200 may be larger than the sizes of the history buttons 121 on the first history screen 100.

The amount of information displayed on the history buttons 121 on the second history screen 200 may be greater than the amount of information displayed on the history buttons 121 on the first history screen 100. The history buttons 121 on the second history screen 200 include (indicate) more information of their corresponding image processings than that on the first history screen 100. For example, for copy, on the history buttons 121*a* on the first history screen 100, "copy" as a type of completed image processing, "color 100% A4" as setting contents of the completed image processing, and "08/20 9:15" as the date and time for processing of the completed image processing are included. In contrast, on the history buttons 121*a* on the second history screen 200, in addition to these pieces of information, more detailed setting contents, for example, "density" and/or "combine pages", may be further included. On the history buttons 121*a* on the second history screen 200, a user name corresponding to the completed image processing may be further included. In this manner, with the amount of information displayed on the history buttons 121 on the second history screen 200 being increased, it is made easier for the user to search for the desired history button 121.

The second history screen 200 may include a group history button being a history button 121 associated with a group determined by classifying a plurality of completed image processings according to a classification condition. The classification condition may be time (for example, date and time) of the image processing, or may be a type (i.e., a function) of the image processing. When the operation inputter 41*b* receives user operation of selecting the group history button, the controller 50 may expand and display the history buttons 121 of the completed image processings corresponding to the selected group history button. With such group history buttons being provided, it is made easier for the user to search for the desired history button 121.

A trigger for screen transition from the first history screen 100 to the second history screen 200 is one of the following patterns (1) to (3).

Trigger Pattern (1) from First History Screen 100 to Second History Screen 200

In pattern (1), as illustrated in FIG. 6A, the first history screen 100 includes a dedicated button 123 to switch from the first history screen 100 to the second history screen 200. In response to the operation inputter 41*b* receiving user operation of selecting the dedicated button 123, the controller 50 controls the display 41*a* to switch from the first history screen 100 to the second history screen 200. Thus, for example, when the desired history button 121 is not present on the first history screen 100, the user can operate the dedicated button 123 to smoothly switch to the second history screen 200.

In the illustrated example, the dedicated button 123 is arranged in the history region 120 (specifically, an upper part of the history region 120) on the first history screen 100, and is provided with text "expand and display". With the dedicated button 123 being arranged in the history region 120 on the first history screen 100, the user can intuitively understand that the history region 120 is to be expanded. The dedicated button 123 need not be provided with text. For example, the dedicated button 123 may be provided with a symbol image indicating full screen display.

Trigger Pattern (2) from First History Screen 100 to Second History Screen 200

In pattern (2), as illustrated in FIG. 6A, in response to the operation inputter 41*b* receiving user operation of selecting the history button 121 in the first history screen 100, the controller 50 controls the display 41*a* to switch from the first history screen 100 to the second history screen 200. That is, when one of the history buttons 121 in the first history screen 100 is operated, the controller 50 switches from the first history screen 100 to the second history screen 200. Thus, the need for the dedicated button 123 as in pattern (1) can be eliminated.

In response to the operation inputter 41*b* receiving scroll operation in the history region 120 on the first history screen 100, the controller 50 may control the display 41*a* to switch from the first history screen 100 to the second history screen 200. Thus, in a situation where the user searches for the desired history button 121, the first history screen 100 can be appropriately switched to the second history screen 200.

Trigger Pattern (3) from First History Screen 100 to Second History Screen 200

In pattern (3), as illustrated in FIG. 6A, in response to reception of operation on a boundary between the menu region 110 and the history region 120 on the first history screen 100, the controller 50 controls the display 41*a* to switch from the first history screen 100 to the second history screen 200. Thus, the need for the dedicated button 123 as in pattern (1) can be eliminated.

For example, in response to reception of operation (slide operation, drag operation) of moving the boundary between the menu region 110 and the history region 120 from the history region 120 side to the menu region 110 side on the first history screen 100, the controller 50 controls the display 41*a* to switch from the first history screen 100 to the second history screen 200. In that case, when the operation of moving the boundary ends before reaching the left end of the screen, the controller 50 may fix the boundary at the time point of such ending. As a result, on the second history screen 200, while the history region 120 is expanded, the menu region 110 may be shrunk and displayed.

Control Flow Example

Figure 7:
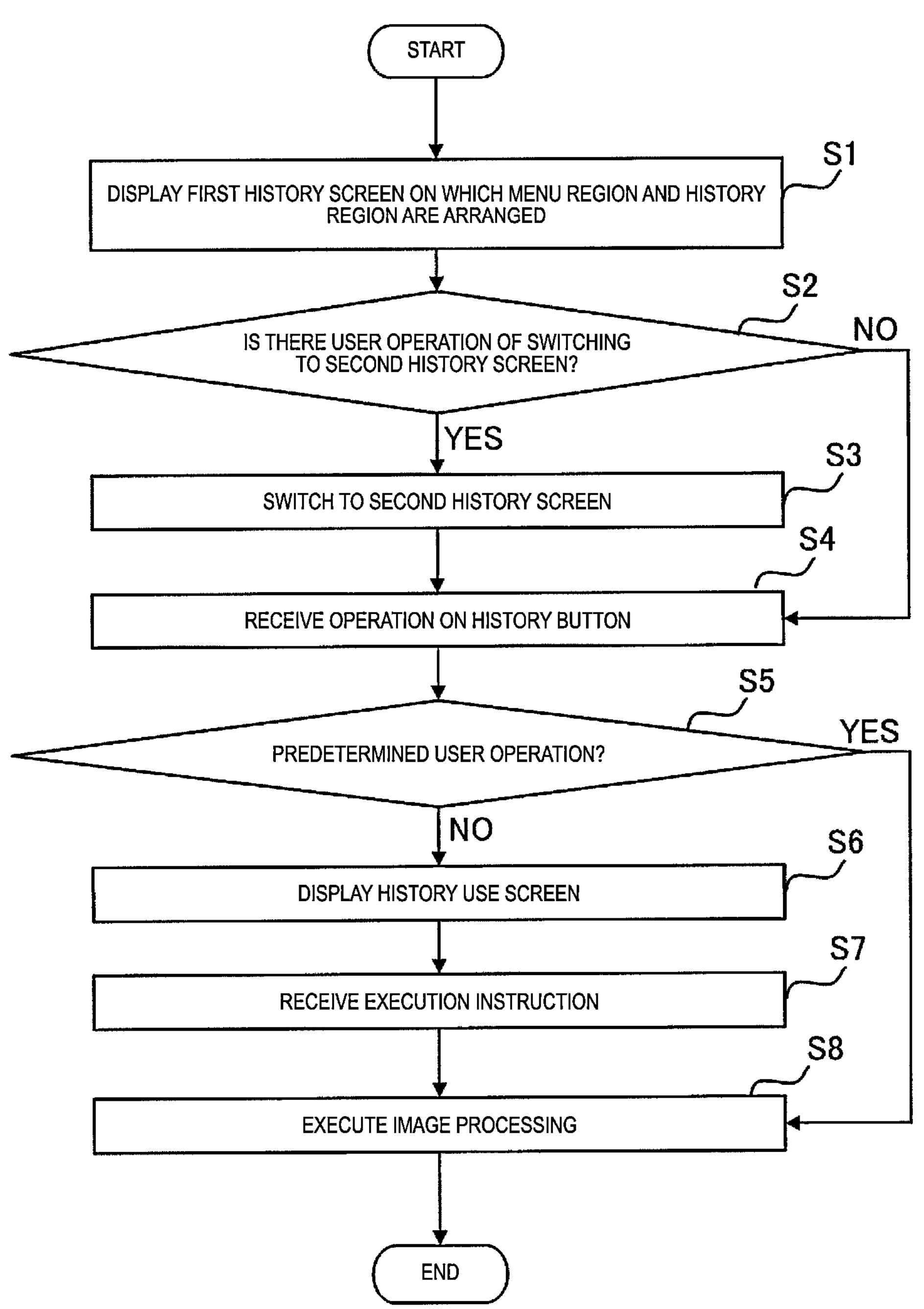
FIG. 7 is a diagram illustrating a control flow example of the image processing apparatus according to the embodiment.

A control flow example of the image processing apparatus 1 according to the embodiment will be described. FIG. 7 is a diagram illustrating a control flow example of the image processing apparatus 1 according to the embodiment. Here, a case is assumed in which one of the history buttons 121 is operated by the user.

In step S1, the controller 50 controls the display 41*a* to display the first history screen 100, on which the menu region 110 and the history region 120 are arranged. In the menu region 110, the function buttons 111 corresponding to the types of the image processings (i.e., the plurality of functions of the image processing apparatus 1) are arranged. In the history region 120, the history buttons corresponding to the completed image processings are arranged.

In step S2, the controller 50 determines whether the operation inputter 41*b* has received user operation of switching from the first history screen 100 to the second history screen 200. The user operation is one of trigger patterns (1) to (3) described above, for example. When it is determined that the user operation has been received (step S2: YES), the controller 50 causes the processing to proceed to step S3. In contrast, when it is determined that the user operation has not been received (step S2: NO), the controller 50 causes the processing to proceed to step S4.

In step S3, the controller 50 controls the display 41*a* to switch from the first history screen 100 to the second history screen 200 on which the history region 120 is expanded.

In step S4, the operation inputter 41*b* receives user operation on one of the history buttons 121.

In step S5, the controller 50 determines whether the user operation received in step S4 is predetermined user operation. The predetermined user operation is a long-press operation on the history button 121 or consecutive-press operation (for example, double tap) on the history button 121. When it is determined that the user operation received in step S4 is the predetermined user operation (step S5: YES), the controller 50 skips steps S6 and S7 and causes the processing to proceed to step S8. In contrast, when it is determined that the user operation received in step S4 is not the predetermined user operation (step S5: NO), the controller 50 causes the processing to proceed to step S6. In this manner, in the illustrated example, when the operation inputter 41*b* receives the predetermined user operation on the history button 121, without separately receiving an execution instruction of instructing execution of image processing corresponding to the history button 121 from the user, the controller 50 executes the image processing with the predetermined user operation being a trigger. Thus, using the history button 121, the image processing apparatus 1 can be caused to execute the image processing more quickly.

In step S6, the controller 50 controls the display 41*a* to display the history use screen 210 (see FIG. 5) to set the condition to be currently applied, with the condition (setting contents) of the completed image processing corresponding to the history button 121 operated in step S4 being an initial value.

In step S7, the operation inputter 41*b* receives an execution instruction (i.e., operation on the execution button) of instructing execution of the image processing from the user while the history use screen 210 is displayed.

In step S8, the controller 50 controls the image processor 3 to execute the instructed image processing.

First Variation of Expansion Operation in History Region

A first variation of the expansion operation in the history region 120 according to the embodiment will be described, mainly regarding differences from the embodiment described above. FIGS. 8A and 8B are diagrams for illustrating the present variation.

In the present variation, as illustrated in FIG. 8B, the second history screen 200 is a screen including the expanded history region 120 without including the menu region 110. Note that FIG. 8A illustrates an example of switching to the second history screen 200 in response to trigger pattern (2) described above, that is, the operation inputter 41*b* receiving the user operation of selecting the history button 121 in the first history screen 100.

In the present variation, as illustrated in FIG. 8B, the second history screen 200 includes the history region 120 and an additional history region 125 to be added due to expansion of the history region 120. On the second history screen 200, the position of the history region 120 is maintained, and the additional history region 125 is arranged at the position corresponding to the position of the menu region 110 on the first history screen 100. That is, the region corresponding to the menu region 110 on the first history screen 100 is used as the additional history region 125 on the second history screen 200, and the history region 120 is arranged in a manner the same as and/or similar to the first history screen 100. Thus, the region corresponding to the menu region 110 can be effectively utilized to display the history information.

In the present variation, the additional history region 125 on the second history screen 200 illustrated in FIG. 8B includes a plurality of condition-specific history regions 126 respectively associated with the classification conditions. In each of the plurality of condition-specific history regions 126, the history buttons 121 corresponding to the completed image processings matching a corresponding classification condition are arranged. Here, as the plurality of condition-specific history regions 126, two condition-specific history regions 126*a* and 126*b* each configured in the vertical direction are illustrated. However, the second history screen 200 may include two or more condition-specific history regions 126. Thus, the history buttons 121 can be displayed by classification condition, and it is made easier for the user to search for the desired history button 121. Note that the additional history region 125 or each condition-specific history region 126 may be scrolled in the vertical direction.

The plurality of condition-specific history regions 126 are a plurality of function-specific history regions corresponding to a plurality of functions (types of image processings) of the image processing apparatus 1, a plurality of date-specific history regions corresponding to a plurality of dates, or a plurality of duration-specific history regions corresponding to a plurality of durations having different time lengths. Here, an example is illustrated in which the plurality of condition-specific history regions 126 are a plurality of date-specific history regions corresponding to a plurality of dates. Thus, it is made easier for the user to search for the desired history button 121 by date. In the illustrated example, the condition-specific history region 126*a* includes the history buttons 121 of respective completed image processings belonging to the date of the current day, and includes the history buttons 121 of respective completed image processings belonging to a specific date previous to the current day.

Second Variation of Expansion Operation in History Region

Figure 9:
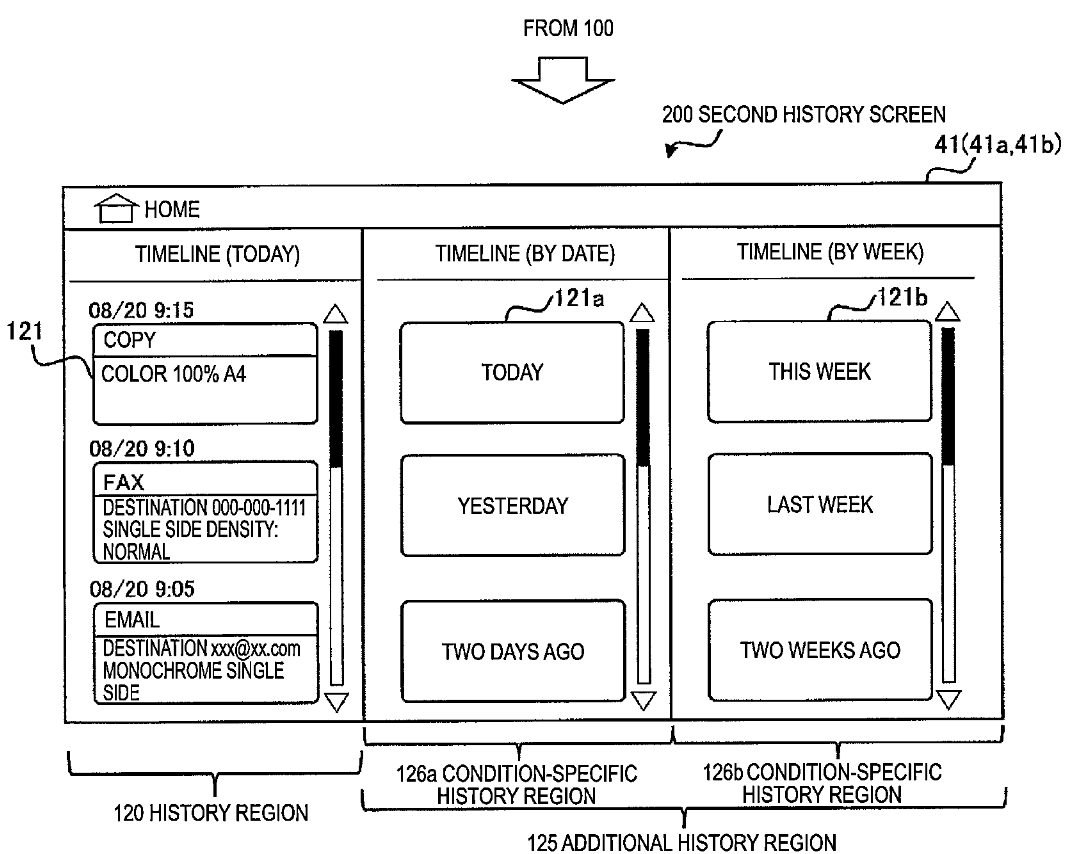
FIG. 9 is a diagram for illustrating a second variation of the expansion operation in the history region according to the embodiment.

A second variation of the expansion operation in the history region 120 according to the embodiment will be described, mainly regarding differences from the embodiment and its variation described above. FIG. 9 is a diagram for illustrating the present variation.

In the present variation, as illustrated in FIG. 9, the second history screen 200 includes the history region 120 and the additional history region 125 to be added due to expansion of the history region 120. On the second history screen 200, the history region 120 is moved to the position corresponding to the position of the menu region 110 on the first history screen 100, and the additional history region 125 is arranged at the position corresponding to the position of the history region 120 on the first history screen 100. Specifically, the history region 120 arranged on the right end side on the first history screen 100 is arranged on the left end side on the second history screen 200. On the second history screen 200, the additional history region 125 is arranged to cover the position on the right end side.

As in trigger patterns (1) and (2), in switching to the second history screen 200 in response to user operation in the history region 120 on the first history screen 100, it is considered that the line of sight and a finger of the user are directed toward the right end side of the screen. Thus, with the additional history region 125 being arranged to cover the position on the right end side, it is made easier for the user to smoothly operate the history buttons 121 in the additional history region 125. Note that such an arrangement method (layout) of the additional history region 125 can also be applied to the first variation described above and variations to be described later. Note that, in a manner the same as and/or similar to the first variation described above, on the second history screen 200, the position of the history region 120 may be maintained, and the additional history region 125 may be arranged at the position corresponding to the position of the menu region 110 on the first history screen 100.

In the present variation, the additional history region 125 on the second history screen 200 illustrated in FIG. 9 includes the plurality of condition-specific history regions 126 respectively associated with the classification conditions. In each of the plurality of condition-specific history regions 126, the history buttons 121 corresponding to the completed image processings matching a corresponding classification condition are arranged. Here, as the plurality of condition-specific history regions 126, two condition-specific history regions 126*a* and 126*b* each configured in the vertical direction are illustrated. Each condition-specific history region 126 is configured to be scrollable in the vertical direction.

The plurality of condition-specific history regions 126 are a plurality of duration-specific history regions corresponding to a plurality of durations having different time lengths. In the illustrated example, the condition-specific history region 126*a* is a date-specific history region, and the condition-specific history region 126*b* is a week-specific history region. When the screen size has room, a month-specific history region may be added. In each condition-specific history region 126, the group history button being the history button 121 associated with a group in which the plurality of completed image processings are classified according to the classification condition is arranged. When the operation inputter 41*b* receives user operation on one of the group history buttons, the controller 50 controls the display 41*a* to expand and display the history buttons of respective completed image processings belonging to the group corresponding to the operated group history button.

In the illustrated example, in the condition-specific history region 126*a*, a plurality of date-specific history buttons 121*a* are arranged, and in the condition-specific history region 126*b*, a plurality of week-specific history buttons 121*a* are arranged. When the operation inputter 41*b* receives user operation on one of the history buttons 121*a*, the controller 50 controls the display 41*a* to expand and display the history buttons of respective completed image processings belonging to the date corresponding to the operated history button 121*a*. In contrast, when the operation inputter 41*b* receives user operation on one of the history buttons 121*b*, the controller 50 controls the display 41*a* to expand and display the history buttons of respective completed image processings belonging to the week corresponding to the operated history button 121*a*.

FIGS. 10A and 10B are diagrams for illustrating an example of a trigger for switch to the second history screen 200 according to the present variation.

As illustrated in FIG. 10A, the first history screen 100 includes the dedicated button 123 to switch from the first history screen 100 to the second history screen 200. In response to the operation inputter 41*b* receiving user operation of selecting the dedicated button 123, the controller 50 controls the display 41*a* to switch from the first history screen 100 to the second history screen 200 illustrated in FIG. 10B. In the illustrated example, the dedicated button 123 is arranged in an upper part of the history region 120 on the first history screen 100, and is provided with a symbol image indicating full screen display.

In the illustrated example, in the menu region 110 on the first history screen 100, a dedicated button 113 to display the menu region 110 on the full screen is arranged. In response to the operation inputter 41*b* receiving user operation of selecting the dedicated button 113, the controller 50 controls the display 41*a* to display the menu region 110 on the full screen, that is, display the home screen not including the history region 120. In the menu region 110 expanded as described above, more function buttons 111 can be displayed.

Third Variation of Expansion Operation in History Region

Figures 11A, 11B, 11C:
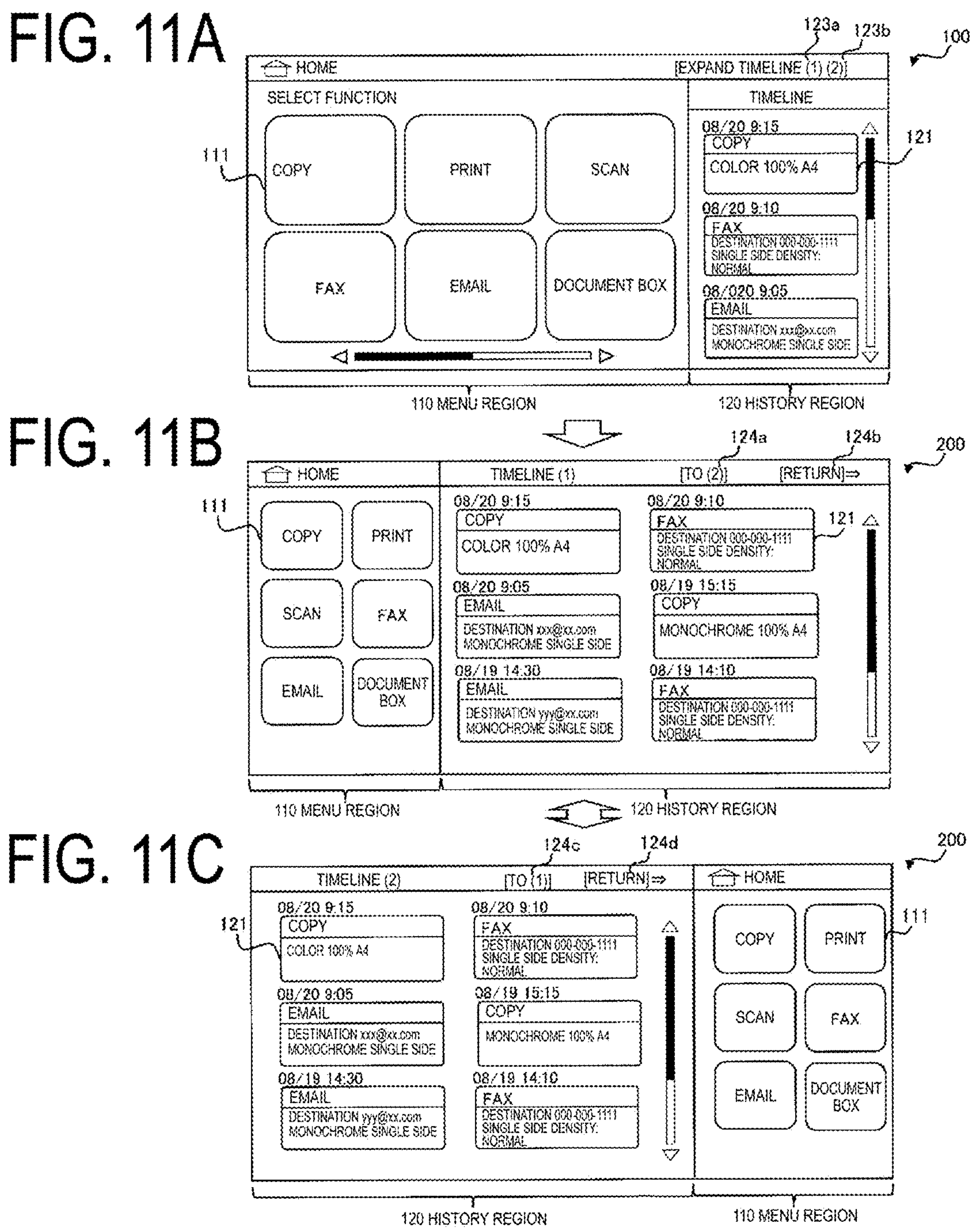
FIGS. 11A, 11B and 11C are diagrams for illustrating a third variation of the expansion operation in the history region according to the embodiment.

A third variation of the expansion operation in the history region 120 according to the embodiment will be described, mainly regarding differences from the embodiment and its variations described above. FIGS. 11A, 11B and 11C are diagrams for illustrating the present variation.

In the present variation, as illustrated in FIG. 11B and FIG. 11C, the second history screen 200 is a screen including the expanded history region 120 and the menu region 110 shrunk along with expansion of the history region 120. The second history screen 200 includes a dedicated button 124*a*/124*c* to interchange a positional relationship between the shrunk menu region 110 and the expanded history region 120. In response to the operation inputter 41*b* receiving user operation of selecting the dedicated button 124*a*/124*c* on the second history screen 200, the controller 50 controls the display 41*a* to interchange the positional relationship between the shrunk menu region 110 and the expanded history region 120.

Specifically, in the layout example of the second history screen 200 illustrated in FIG. 11B, the shrunk menu region 110 is located on the left side, and the expanded history region 120 is located on the right side. When the operation inputter 41*b* receives user operation of selecting the dedicated button 124*a* arranged in the history region 120 illustrated in FIG. 11B, the controller 50 switches to the layout illustrated in FIG. 11C. When the operation inputter 41*b* receives user operation of selecting a "return" button 124*b* arranged in the history region 120 illustrated in FIG. 11B, the controller 50 switches to the first history screen 100 illustrated in FIG. 11A.

In the layout example of the second history screen 200 illustrated in FIG. 11C, the shrunk menu region 110 is located on the right side, and the expanded history region 120 is located on the left side. When the operation inputter 41*b* receives user operation of selecting the dedicated button 124*c* arranged in the history region 120 illustrated in FIG. 11B, the controller 50 switches to the layout illustrated in FIG. 11B. When the operation inputter 41*b* receives user operation of selecting a "return" button 124*d* arranged in the history region 120 illustrated in FIG. 11C, the controller 50 switches to the first history screen 100 illustrated in FIG. 11A.

The first history screen 100 illustrated in FIG. 11A includes a dedicated button 123*a* to switch to the layout of the second history screen 200 illustrated in FIG. 11B and a dedicated button 123*b* to switch to the layout of the second history screen 200 illustrated in FIG. 11C. When the operation inputter 41*b* receives user operation of selecting the dedicated button 123*a* illustrated in FIG. 11A, the controller 50 switches to the layout illustrated in FIG. 11B. In contrast, when the operation inputter 41*b* receives user operation of selecting the dedicated button 123*b* illustrated in FIG. 11A, the controller 50 switches to the layout illustrated in FIG. 11C.

Note that, in the present variation, in response to the operation inputter 41*b* receiving user operation of selecting the shrunk menu region 110, the controller 50 may control the display 41*a* to switch from the second history screen 200 to the first history screen 100. In the present variation, the history region 120 on the second history screen 200 may be provided with the condition-specific history regions 126.

Fourth Variation of Expansion Operation in History Region

A fourth variation of the expansion operation in the history region 120 according to the embodiment will be described, mainly regarding differences from the embodiment and its variations described above. FIGS. 12A and 12B are diagrams for illustrating the present variation.

In the present variation, in response to the operation inputter 41*b* receiving user operation of designating the classification condition, the controller 50 controls the display 41*a* to display the plurality of condition-specific history regions 126 according to the designated classification condition. For example, on the second history screen 200 illustrated in FIG. 12A, in response to the operation inputter 41*b* receiving user operation of selecting an "arrange by function" button 127*a*, as illustrated in FIG. 12B, the controller 50 controls the display 41*a* to display the condition-specific history regions 126 classified according to the function. Note that, when the operation inputter 41*b* receives user operation of selecting a "return" button 127*b* arranged in the history region 120 illustrated in FIG. 12A, the controller 50 switches to the first history screen 100.

In FIG. 12B, the plurality of condition-specific history regions 126 provided in the history region 120 are a plurality of function-specific history regions corresponding to the plurality of functions of the image processing apparatus 1. In the illustrated example, in the condition-specific history region 126*a*, the history buttons 121 of respective completed image processings matching the "copy" function are arranged in chronological order from the upper side to the lower side. In the condition-specific history region 126*b*, the history buttons 121 of respective completed image processings matching the "FAX" function are arranged in chronological order from the upper side to the lower side. Here, when the operation inputter 41*b* receives user operation on a "next" button 127*e* provided in the history region 120, the controller 50 controls the display 41*a* to display the condition-specific history regions 126 for functions different from "copy" and "FAX" in the history region 120.

On the second history screen 200 illustrated in FIG. 12B, in response to the operation inputter 41*b* receiving user operation of selecting an "arrange in order of date and time" button 127*c*, the controller 50 controls the display 41*a* to display the plurality of condition-specific history regions 126 classified in order of the date and time. Note that, when the operation inputter 41*b* receives user operation of selecting a "return" button 127*d* arranged in the history region 120 illustrated in FIG. 12B, the controller 50 switches to the first history screen 100.

Other Embodiments

Figure 13:
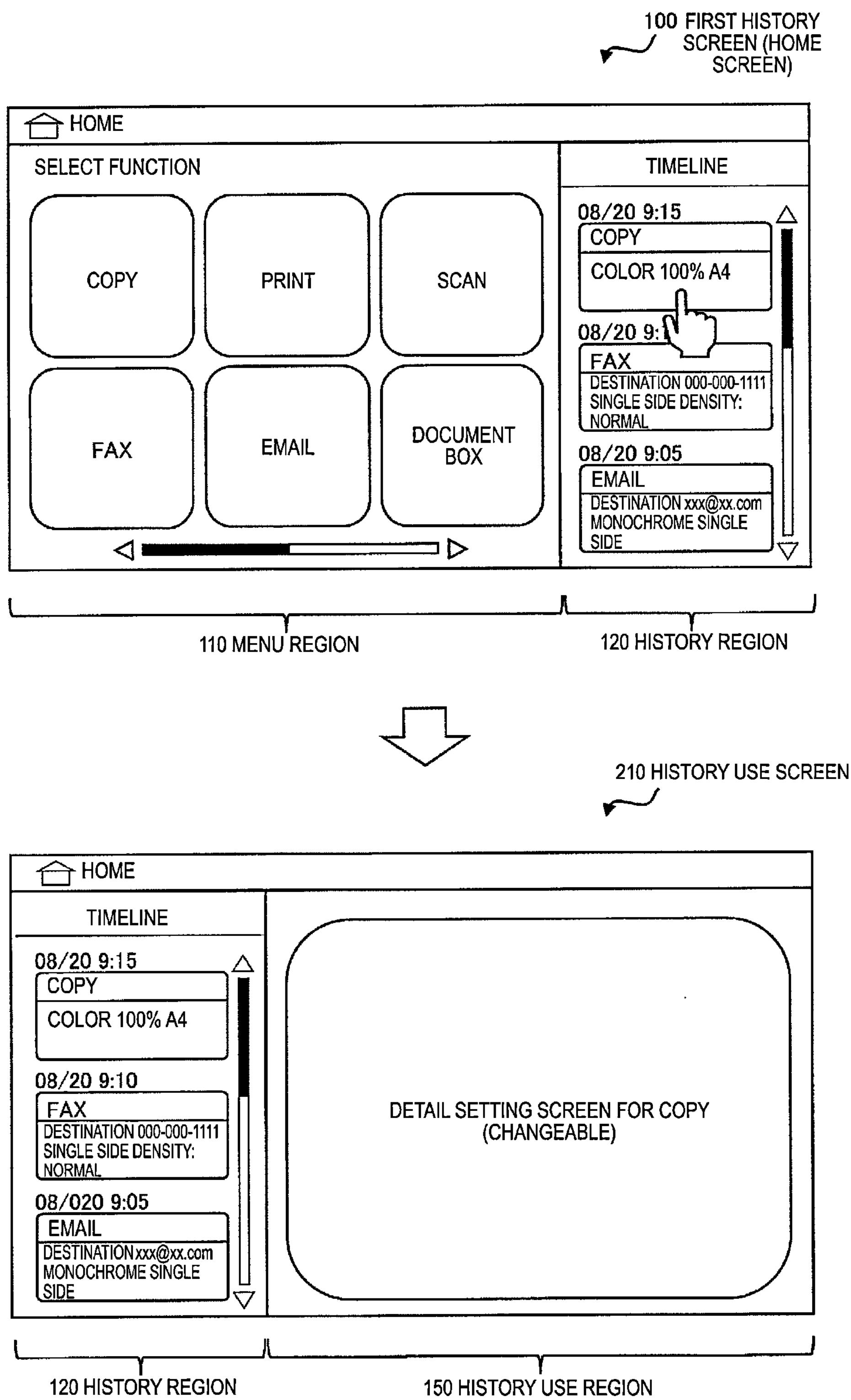
FIG. 13 is a diagram for illustrating expansion operation in the history region according to another embodiment.

The history use screen 210 may be regarded as a type of second history screen 200. The history use region 150 on the history use screen 210 may be regarded as a part of the expanded history region 120, specifically, the additional history region 125 to be added due to expansion of the history region 120. In that case, as illustrated in FIG. 13, on the history use screen 210 (second history screen 200), the history region 120 may be moved to the position corresponding to the position of the menu region 110 on the first history screen 100, and the history use region 150 (additional history region 125) may be arranged at the position corresponding to the position of the history region 120 on the first history screen 100. Specifically, the history region 120 arranged on the right end side on the first history screen 100 is arranged on the left end side on the history use screen 210. On the history use screen 210 (second history screen 200), the history use region 150 (additional history region 125) is arranged to cover the position on the right end side. In switching to the history use screen 210 in response to user operation on the history button 121 on the first history screen 100, it is considered that the line of sight and a finger of the user are directed toward the right end side of the screen. Therefore, with the history use region 150 being arranged to cover the position on the right end side, it is made easier for the user to smoothly operate the history use region 150.

The operational flow of the embodiment described above need not be executed in chronological order according to the order described in the flow diagram. For example, the steps of operation may be performed in a different order from that described in the flow diagram or may be performed in parallel. Some steps of operation may be omitted and additional steps may be added to the process.

A program may be provided that causes the image processing apparatus 1 to perform operations according to the embodiment described above. The program may be recorded on a computer readable medium. Use of the computer readable medium enables the program to be installed on the computer (image processing apparatus 1). Here, the computer readable medium on which the program is recorded may be a non-transitory recording medium. The non-transitory recording medium is not particularly limited, and may be, for example, a recording medium such as a CD-ROM or a DVD-ROM. Circuits for executing processings performed by the image processing apparatus 1 may be integrated, and at least part of the image processing apparatus 1 may be configured as a semiconductor integrated circuit (a chipset or an SoC).

The phrases "based on" and "depending on" used in the present disclosure do not mean "based only on" and "depending only on," unless specifically stated otherwise. The phrase "based on" means both "based only on" and "based at least in part on". In the same and/or similar manner, the phrase "depending on" means both "only depending on" and "at least partially depending on". The terms "include", "comprise", and variations thereof do not mean "include only items stated" but instead mean "may include only items stated" or "may include not only the items stated but also other items". The term "or" used in the present disclosure is not intended to be "exclusive or". Moreover, any references to elements using designations such as "first" and "second" as used in the present disclosure do not generally limit the quantity or order of those elements. These designations may be used herein as a convenient method of distinguishing between two or more elements. Thus, a reference to first and second elements does not mean that only two elements may be employed there or that the first element needs to precede the second element in some manner. For example, when the English articles such as "a," "an," and "the" are added in the present disclosure through translation, these articles include the plural unless clearly indicated otherwise in context.

The embodiment has been described above in detail with reference to the drawings, but specific configurations are not limited to those described above, and various design variation can be made without departing from the gist of the present disclosure.

Supplementary Notes

Features relating to the embodiment described above will be described below as supplements.

Supplementary Note 1

An image processing apparatus 1 for executing a plurality of functions related to image processings, the image processing apparatus 1 including:

an operation panel 40 including a display 41*a* configured to display a first history screen 100 on which a menu region 110 and a history region 120, the menu region 110 including function buttons 111 arranged therein, the function buttons 111 corresponding to a plurality of functions, the history region 120 including history buttons 121 arranged therein, the history buttons 121 corresponding to completed image processings; and a controller 50 configured to control the display 41*a* to switch from the first history screen 100 to a second history screen 200 on which the history region 120 is expanded, in response to user operation on the operation panel 40.

Supplementary Note 2

The image processing apparatus 1 according to supplementary note 1, wherein the number of the history buttons 121 displayed on the second history screen 200 is greater than the number of the history buttons 121 displayed on the first history screen 100.

Supplementary Note 3

The image processing apparatus 1 according to supplementary note 2, wherein sizes of the history buttons 121 on the second history screen 200 are equal to the sizes of the history buttons 121 on the first history screen 100.

Supplementary Note 4

The image processing apparatus 1 according to any one of supplementary notes 1 to 3, wherein an amount of information displayed on the history buttons 121 on the second history screen 200 is greater than the amount of the information displayed on the history buttons 121 on the first history screen 100.

Supplementary Note 5

The image processing apparatus 1 according to any one of supplementary notes 1 to 4, wherein the second history screen 200 includes a group history button 121*a*/121*b*, the group history button 121*a*/121*b* being a history button 121 of the history buttons 121, the history button 121 associated with a group determined by classifying a plurality of the completed image processings according to a classification condition.

Supplementary Note 6

The image processing apparatus 1 according to any one of supplementary notes 1 to 5, wherein the first history screen 100 includes a dedicated button 123 to switch from the first history screen 100 to the second history screen 200, and the controller 50 controls the display 41*a* to switch from the first history screen 100 to the second history screen 200, in response to reception of the user operation of selecting the dedicated button 123.

Supplementary Note 7

The image processing apparatus 1 according to supplementary note 6, wherein the dedicated button 123 is arranged in the history region 120 on the first history screen 100.

Supplementary Note 8

The image processing apparatus 1 according to any one of supplementary notes 1 to 5, wherein the controller 50 controls the display 41*a* to switch from the first history screen 100 to the second history screen 200, in response to reception of the user operation of selecting a history button 121 of the history buttons 121 in the first history screen 100.

Supplementary Note 9

The image processing apparatus 1 according to any one of supplementary notes 1 to 5, wherein on the first history screen 100, in response to reception of operation on a boundary between the menu region 110 and the history region 120, the controller 50 controls the display 41*a* to switch from the first history screen 100 to the second history screen 200.

Supplementary Note 10

The image processing apparatus 1 according to supplementary note 9, wherein on the first history screen 100, in response to reception of the operation of moving the boundary from a side of the history region 120 to the side of the menu region 110, the controller 50 controls the display 41*a* to switch from the first history screen 100 to the second history screen 200.

Supplementary Note 11

The image processing apparatus 1 according to any one of supplementary notes 1 to 10, wherein when predetermined user operation on a history button 121 of the history buttons 121 is received, without separately receiving an execution instruction of instructing execution of image processing corresponding to the history button 121 from a user, the controller 50 executes the image processing with the predetermined user operation being a trigger.

Supplementary Note 12

The image processing apparatus 1 according to supplementary note 11, wherein the predetermined user operation is a long-press operation on the history button 121 or consecutive-press operation on the history button 121.

Supplementary Note 13

The image processing apparatus 1 according to any one of supplementary notes 1 to 12, wherein the second history screen 200 includes the history region 120 and an additional history region 125 to be added due to expansion of the history region 120, and on the second history screen 200, a position of the history region 120 is maintained, and the additional history region 125 is arranged at a position corresponding to a position of the menu region 110 on the first history screen 100.

Supplementary Note 14

The image processing apparatus 1 according to any one of supplementary notes 1 to 13, wherein the second history screen 200 is a screen including the expanded history region 120 without including the menu region 110.

Supplementary Note 15

The image processing apparatus 1 according to supplementary note 14, wherein the second history screen 200 includes the history region 120 and an additional history region 125 to be added due to expansion of the history region 120, and on the second history screen 200, the history region 120 is moved to a position corresponding to the position of the menu region 110 on the first history screen 100, and the additional history region 125 is arranged at a position corresponding to the position of the history region 120 on the first history screen 100.

Supplementary Note 16

The image processing apparatus 1 according to any one of supplementary notes 1 to 13, wherein the second history screen 200 is a screen including the expanded history region 120 and the menu region 110 shrunk along with expansion of the history region 120.

Supplementary Note 17

The image processing apparatus 1 according to supplementary note 16, wherein the controller 50 controls the display 41*a* to switch from the second history screen 200 to the first history screen 100, in response to reception of the user operation of selecting the shrunk menu region 110.

Supplementary Note 18

The image processing apparatus 1 according to supplementary note 16 or 17, wherein the second history screen 200 includes a dedicated button 124*a*/124*c* to interchange a positional relationship between the shrunk menu region 110 and the expanded history region 120, and the controller 50 controls the display 41*a* to interchange the positional relationship between the shrunk menu region 110 and the expanded history region 120, in response to reception of the user operation of selecting the dedicated button 124*a*/124*c* on the second history screen 200.

Supplementary Note 19

The image processing apparatus 1 according to any one of supplementary notes 1 to 18, wherein the second history screen 200 includes a plurality of condition-specific history regions 126 respectively associated with classification conditions, and in each of the plurality of condition-specific history regions 126, the history buttons 121 corresponding to the completed image processings matching a corresponding classification condition are arranged.

Supplementary Note 20

The image processing apparatus 1 according to supplementary note 19, wherein the plurality of condition-specific history regions 126 are a plurality of function-specific history regions corresponding to the plurality of functions, a plurality of date-specific history regions corresponding to a plurality of dates, or a plurality of duration-specific history regions corresponding to a plurality of durations having different time lengths.

Supplementary Note 21

The image processing apparatus 1 according to supplementary note 19 or 20, wherein in response to reception of the user operation of designating the classification condition, the controller 50 controls the display 41*a* to display the plurality of condition-specific history regions 126 according to the designated classification condition.

Supplementary Note 22

A control method for controlling an image processing apparatus 1 for executing a plurality of functions related to image processings, the control method including:

displaying, on an operation panel 40, a first history screen 100 on which a menu region 110 and a history region 120 are arranged, the menu region 110 including function buttons 111 arranged therein, the function buttons 111 corresponding to a plurality of functions, the history region 120 including history buttons 121 arranged therein, the history buttons 121 corresponding to completed image processings; and switching from the first history screen 100 to a second history screen 200 on which the history region 120 is expanded, in response to user operation on the operation panel 40.

Supplementary Note 23

A program for causing an image processing apparatus 1 for executing a plurality of functions related to image processings to execute:

displaying, on an operation panel 40, a first history screen 100 on which a menu region 110 and a history region 120 are arranged, the menu region 110 including function buttons 111 arranged therein, the function buttons 111 corresponding to a plurality of functions, the history region 120 including history buttons 121 arranged therein, the history buttons 121 corresponding to completed image processings; and switching from the first history screen 100 to a second history screen 200 on which the history region 120 is expanded, in response to user operation on the operation panel 40.

The invention claimed is:

1. An image processing apparatus for executing a plurality of functions related to image processing, the image processing apparatus comprising:

an operation panel comprising a display having a main display region and a sub display region arranged side by side, the sub display region smaller than the main display region, the operation panel configured to receive user input; and a controller configured to control the display in response to user operation on the operation panel, wherein in a state where function buttons corresponding to the plurality of functions related to image processing are displayed in the main display region and a plurality of job buttons corresponding to instructions for image processing from a user is displayed in the sub display region, the controller is configured to, in response to a specific job button of the plurality of job buttons in the sub display region being selected by the user operation on the operation panel, control the display to expand and display a plurality of pieces of image processing information associated with the specific job button in the main display region.

2. The image processing apparatus according to claim 1, wherein the plurality of job buttons includes history buttons corresponding to completed instructions for image processing.

3. The image processing apparatus according to claim 1, wherein the plurality of pieces of image processing information expanded and displayed in the main display region includes job buttons.

4. The image processing apparatus according to claim 3, wherein a number of the job buttons displayed in the main display region is greater than a number of the plurality of job buttons displayed in the sub display region.

5. The image processing apparatus according to claim 3, wherein a size of the job buttons in the main display region is equal to a size of the plurality of job buttons in the sub display region.

6. The image processing apparatus according to claim 3, wherein an amount of information displayed on the job buttons in the main display region is greater than an amount of information displayed on the plurality of job buttons in the sub display region.

7. The image processing apparatus according to claim 1, wherein the plurality of pieces of image processing information expanded and displayed in the main display region includes a group job button, and the group job button is a job button that classifies the plurality of job buttons corresponding to the instructions for image processing according to a classification condition.

8. The image processing apparatus according to claim 1, wherein the controller is configured to, in response to a predetermined user operation being received on a job button of the plurality of job buttons, execute the image processing with the predetermined user operation being a trigger, without separately receiving an execution instruction from the user to execute the image processing corresponding to the job button.

9. The image processing apparatus according to claim 8, wherein the predetermined user operation is a long-press operation on the job button or a consecutive-press operation on the job button.

10. The image processing apparatus according to claim 1, wherein the controller is configured to control the display to display the main display region and the sub display region when expanding and displaying the plurality of pieces of image processing information in the main display region.

11. The image processing apparatus according to claim 10, wherein the controller is configured to control the display to display the main display region and the sub display region side by side when expanding and displaying the plurality of pieces of image processing information in the main display region.

12. The image processing apparatus according to claim 1, wherein the controller is configured to, in response to expanding and displaying the plurality of pieces of image processing information in the main display region, control the display to display a plurality of condition-specific display regions respectively associated with classification conditions in the main display region, and the plurality of job buttons matching the corresponding classification condition is arranged in each of the plurality of condition-specific display regions.

13. The image processing apparatus according to claim 12, wherein the plurality of condition-specific display regions is a plurality of function-specific display regions corresponding to the plurality of functions, a plurality of date-specific display regions corresponding to a plurality of dates, or a plurality of duration-specific display regions corresponding to a plurality of durations having different time lengths.

14. The image processing apparatus according to claim 12, wherein the controller is configured to, in response to reception of the user operation designating a classification condition of the classification conditions, control the display to display the plurality of condition-specific display regions according to the designated classification condition.

15. A control method for controlling an image processing apparatus for executing a plurality of functions related to image processing, the control method comprising:

displaying, on an operation panel, a screen having a main display region and a sub display region arranged side by side, the sub display region smaller than the main display region;

displaying function buttons corresponding to the plurality of functions related to image processing in the main display region and displaying a plurality of job buttons corresponding to instructions for image processing from a user in the sub display region;

selecting a specific job button of the plurality of job buttons in the sub display region by user operation on the operation panel; and expanding and displaying a plurality of pieces of image processing information associated with the specific job button in the main display region.

16. The control method according to claim 15, wherein the expanding and displaying includes displaying the main display region and the sub display region.

17. The control method according to claim 16, wherein the expanding and displaying includes displaying the main display region and the sub display region side by side.

18. A non-transitory computer-readable medium storing a program for causing an image processing apparatus for executing a plurality of functions related to image processing to execute:

displaying, on an operation panel, a screen having a main display region and a sub display region arranged side by side, the sub display region smaller than the main display region;

displaying function buttons corresponding to the plurality of functions related to image processing in the main display region and displaying a plurality of job buttons corresponding to instructions for image processing from a user in the sub display region;

selecting a specific job button of the plurality of job buttons in the sub display region by user operation on the operation panel; and expanding and displaying a plurality of pieces of image processing information associated with the specific job button in the main display region.

19. The non-transitory computer-readable medium according to claim 18, wherein the expanding and displaying includes displaying the main display region and the sub display region.

20. The non-transitory computer-readable medium according to claim 19, wherein the expanding and displaying includes displaying the main display region and the sub display region side by side.

* * * * *